(12) United States Patent
Thomas et al.

(10) Patent No.: US 12,737,449 B2
(45) Date of Patent: Sep. 15, 2026

(54) APPARATUS AND METHOD FOR HANDLING STASHING TRANSACTIONS

(71) Applicant: Arm Limited, Cambridge (GB)

(72) Inventors: Tessil Thomas, Cambridge (GB); Yuval Elad, Cambridge (GB); Thanunathan Rangarajan, Bangalore (IN); Carlos Garcia-Tobin, Cambridge (GB)

(73) Assignee: Arm Limited, Cambridge (GB)

( * ) Notice: Subject to any disclaimer, the term of this patent is extended or adjusted under 35 U.S.C. 154(b) by 88 days.

(21) Appl. No.: 18/553,934

(22) PCT Filed: Feb. 14, 2022

(86) PCT No.: PCT/GB2022/050386
§ 371 (c)(1),
(2) Date: Oct. 4, 2023

(87) PCT Pub. No.: WO2022/214776
PCT Pub. Date: Oct. 13, 2022

(65) Prior Publication Data
US 2024/0193260 A1 Jun. 13, 2024

(30) Foreign Application Priority Data
Apr. 7, 2021 (GB) ..................................... 2104930

(51) Int. Cl.
*G06F 21/00* (2013.01)
*G06F 21/53* (2013.01)

(52) U.S. Cl.
CPC .................................. *G06F 21/53* (2013.01)

(58) Field of Classification Search
None
See application file for complete search history.

(56) References Cited

U.S. PATENT DOCUMENTS 9,632,958 B2 4/2017 Dutta et al.
10,764,752 B1 * 9/2020 Avetisov ............ H04L 63/0823
(Continued)

FOREIGN PATENT DOCUMENTS

CN 110140111 8/2019
CN 112585590 3/2021
(Continued)

OTHER PUBLICATIONS

Combined International Search and Examination Report for International Application No. GB2104930.9, dated Jan. 5, 2022.
(Continued)

*Primary Examiner* — Shin-Hon (Eric) Chen
(74) *Attorney, Agent, or Firm* — NIXON & VANDERHYE P.C.

(57) ABSTRACT

An apparatus and method are provided, the apparatus comprising: interconnect circuitry to couple a device to one or more processing elements, each processing element operating in a trusted execution environment; and secure stashing decision circuitry to receive stashing transactions from the device and to redirect permitted stashing transactions to a given storage structure accessible to at least one of the one or more processing elements. The secure stashing decision circuitry is configured, in response to receiving a given stashing transaction, to determine whether the given stashing transaction comprises a trusted execution environment identifier associated with a given trusted execution environment, and to treat the given stashing transaction as a permitted stashing transaction when redirection requirements, dependent on the trusted execution environment identifier, are met.

18 Claims, 14 Drawing Sheets

(56) References Cited

U.S. PATENT DOCUMENTS

| | | | | |
|---|---|---|---|---|
| 10,795,985 | B2 * | 10/2020 | Attfield | G06F 21/62 |
| 10,949,530 | B2 * | 3/2021 | Mei | G06Q 20/3278 |
| 2010/0005264 | A1 * | 1/2010 | Ito | G06F 9/468 711/163 |
| 2015/0281186 | A1 * | 10/2015 | Smith | G06F 21/10 726/27 |
| 2016/0182497 | A1 | 6/2016 | Smith | |
| 2017/0177293 | A1 * | 6/2017 | Krishnakumar | H04L 63/126 |
| 2018/0189199 | A1 * | 7/2018 | Condict | G06F 13/4282 |
| 2018/0210844 | A1 * | 7/2018 | Kim | G06F 21/80 |
| 2018/0247082 | A1 | 8/2018 | Durham et al. | |
| 2018/0276392 | A1 * | 9/2018 | Hoogerbrugge | H04L 9/3236 |
| 2019/0042766 | A1 * | 2/2019 | Pappachan | H04L 9/0819 |
| 2019/0227827 | A1 * | 7/2019 | Zmudzinski | G06F 21/57 |
| 2019/0340147 | A1 | 11/2019 | Jalal et al. | |
| 2020/0142839 | A1 | 5/2020 | Stockwell et al. | |
| 2021/0073403 | A1 * | 3/2021 | Swaine | G06F 21/57 |
| 2021/0200546 | A1 * | 7/2021 | Lemay | G06F 12/145 |
| 2021/0224426 | A1 * | 7/2021 | Cui | G06F 1/3243 |
| 2022/0027520 | A1 * | 1/2022 | Li | G06F 12/1425 |
| 2022/0158856 | A1 * | 5/2022 | Maximov | H04L 9/0894 |

FOREIGN PATENT DOCUMENTS

| | | | | |
|---|---|---|---|---|
| EP | 3367287 A1 | | 8/2018 | |
| GB | 2605774 B | * | 10/2022 | G06F 21/57 |
| JP | 2018-523209 | | 8/2018 | |

OTHER PUBLICATIONS

International Search Report for International Application No. PCT/GB2022/050386, dated May 6, 2022.

Office Action for JP Application No. 2023-560312 issued Feb. 25, 2026 and English translation, 4 pages.

Office Action for CN Application No. 202280034953.2 issued Apr. 20, 2026 and English translation, 14 pages.

* cited by examiner

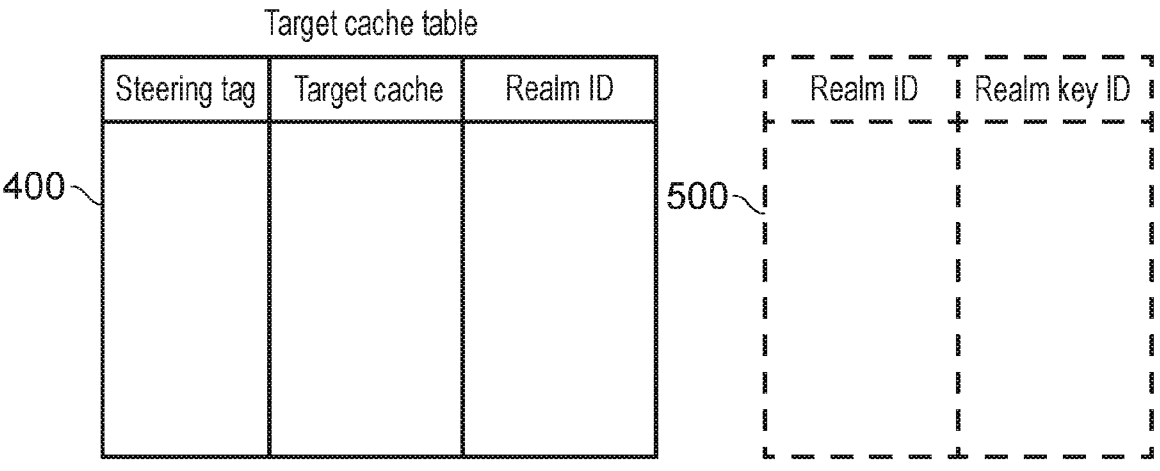

FIG. 15

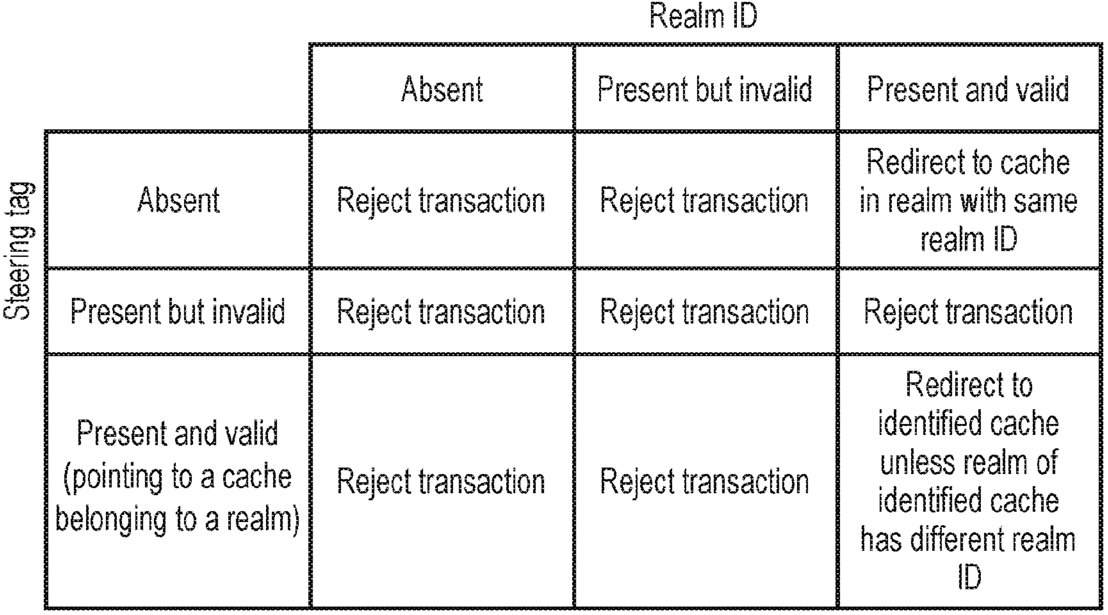

| Steering tag \ Realm ID | Absent | Present but invalid | Present and valid |
|---|---|---|---|
| Absent | Reject transaction | Reject transaction | Redirect to cache in realm with same realm ID |
| Present but invalid | Reject transaction | Reject transaction | Reject transaction |
| Present and valid (pointing to a cache belonging to a realm) | Reject transaction | Reject transaction | Redirect to identified cache unless realm of identified cache has different realm ID |

FIG. 16

APPARATUS AND METHOD FOR HANDLING STASHING TRANSACTIONS

The present technique relates to the field of data processing.

In a data processing system, one or more processing elements may be coupled, via an interconnect, to one or more devices. For example, the devices may include bus master devices, network interface controllers, display controllers, etc. The devices may be capable of issuing memory access requests (also referred to as device transactions) to the interconnect, requesting a memory access to a particular location in a memory accessible to the devices and the one or more processing elements.

Viewed from a first example of the present technique, there is provided an apparatus comprising:

interconnect circuitry to couple a device to one or more processing elements, at least one of which is configured to operate in a trusted execution environment; and secure stashing decision circuitry to receive stashing transactions from the device and to redirect permitted stashing transactions to a given storage structure accessible to at least one of the one or more processing elements, wherein the secure stashing decision circuitry is configured, in response to receiving a given stashing transaction, to determine whether the given stashing transaction comprises a trusted execution environment identifier associated with a given trusted execution environment, and to treat the given stashing transaction as a permitted stashing transaction when redirection requirements, dependent on the trusted execution environment identifier, are met.

Viewed from another example of the present technique, there is provided a method of stashing transactions, the method comprising:

receiving stashing transactions from a device, the device being coupled, via interconnect circuitry, to one or more processing elements at least one of which is configured to operate in a trusted execution environment;

redirecting permitted stashing transactions to a given storage structure accessible to at least one of the one or more processing elements; and in response to receiving a given stashing transaction, determining whether the given stashing transaction comprises a trusted execution environment identifier associated with a given trusted execution environment, and treating the given stashing transaction as a permitted stashing transaction when redirection requirements, dependent on the trusted execution environment identifier, are met.

Further aspects, features and advantages of the present technique will be apparent from the following description of examples, which is to be read in conjunction with the accompanying drawings, in which.

Figure 4:
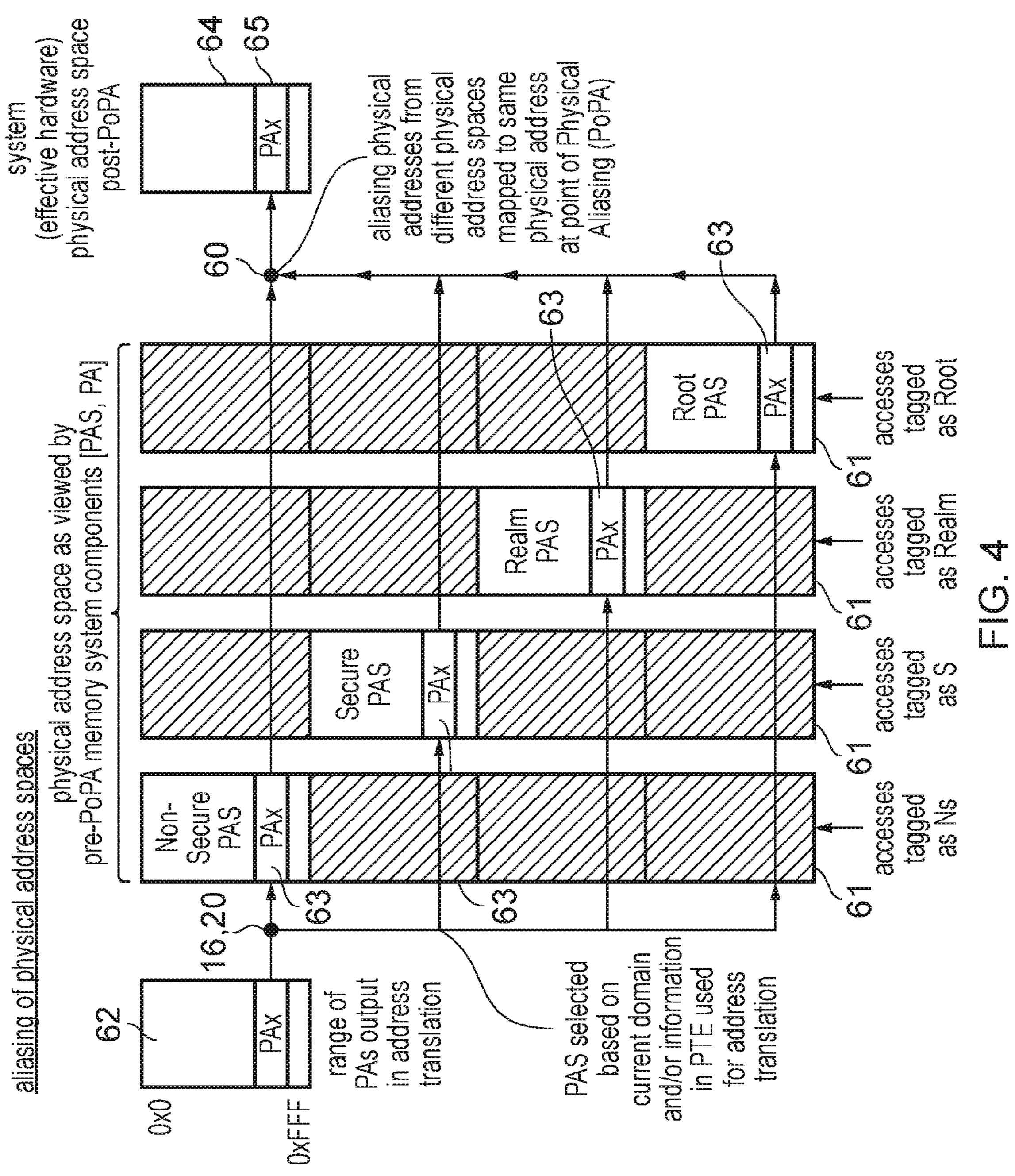
Figure 5:
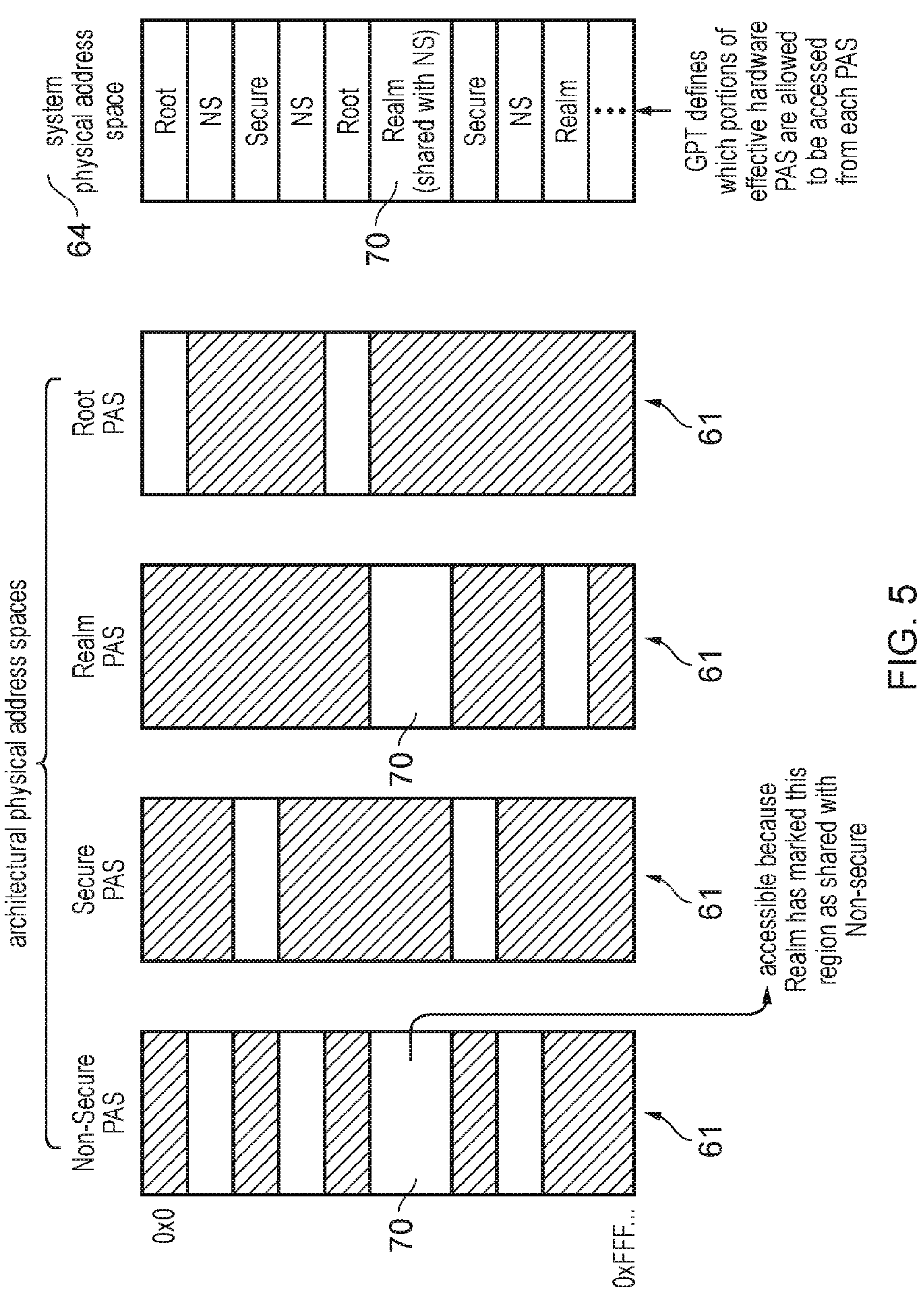
Figure 6:
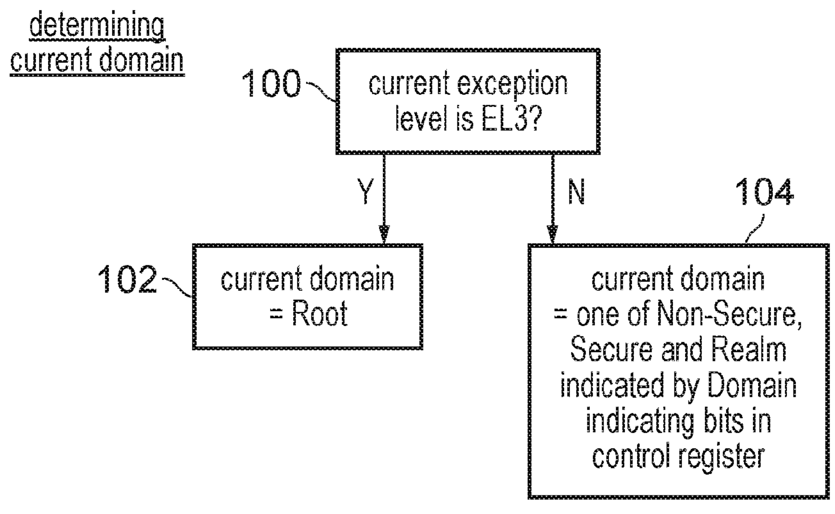
Figure 7:
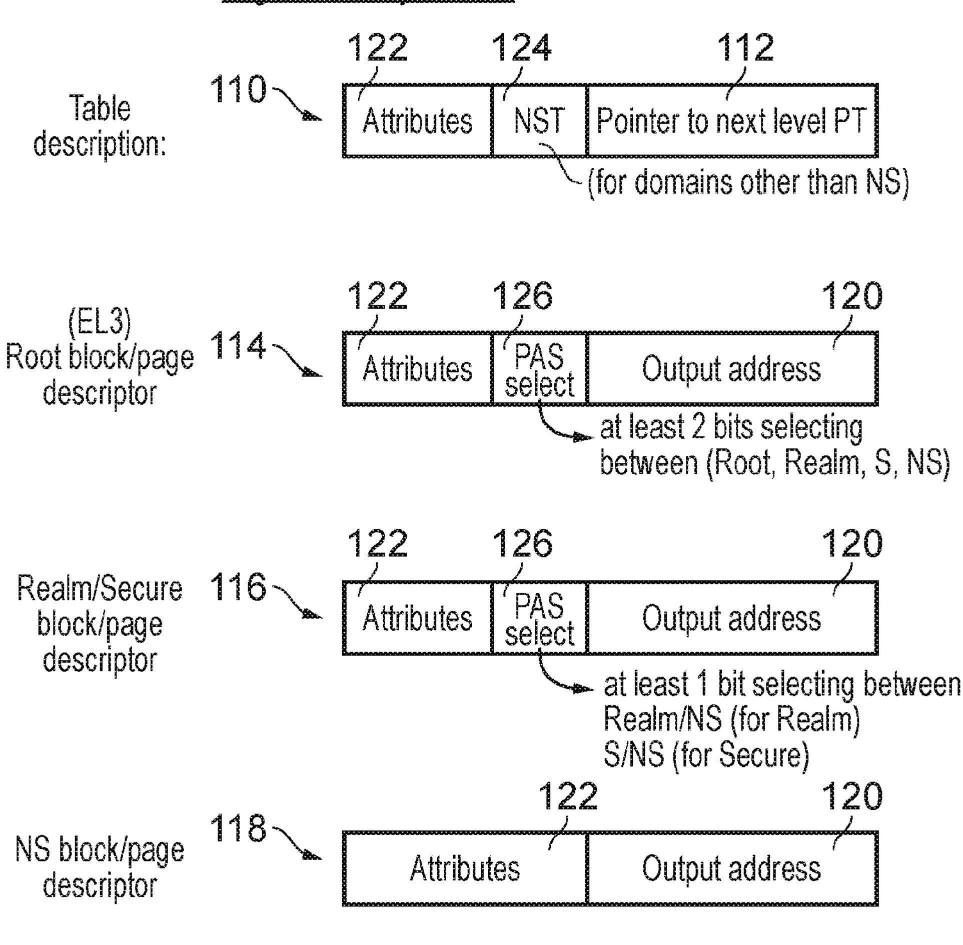
Figure 8:
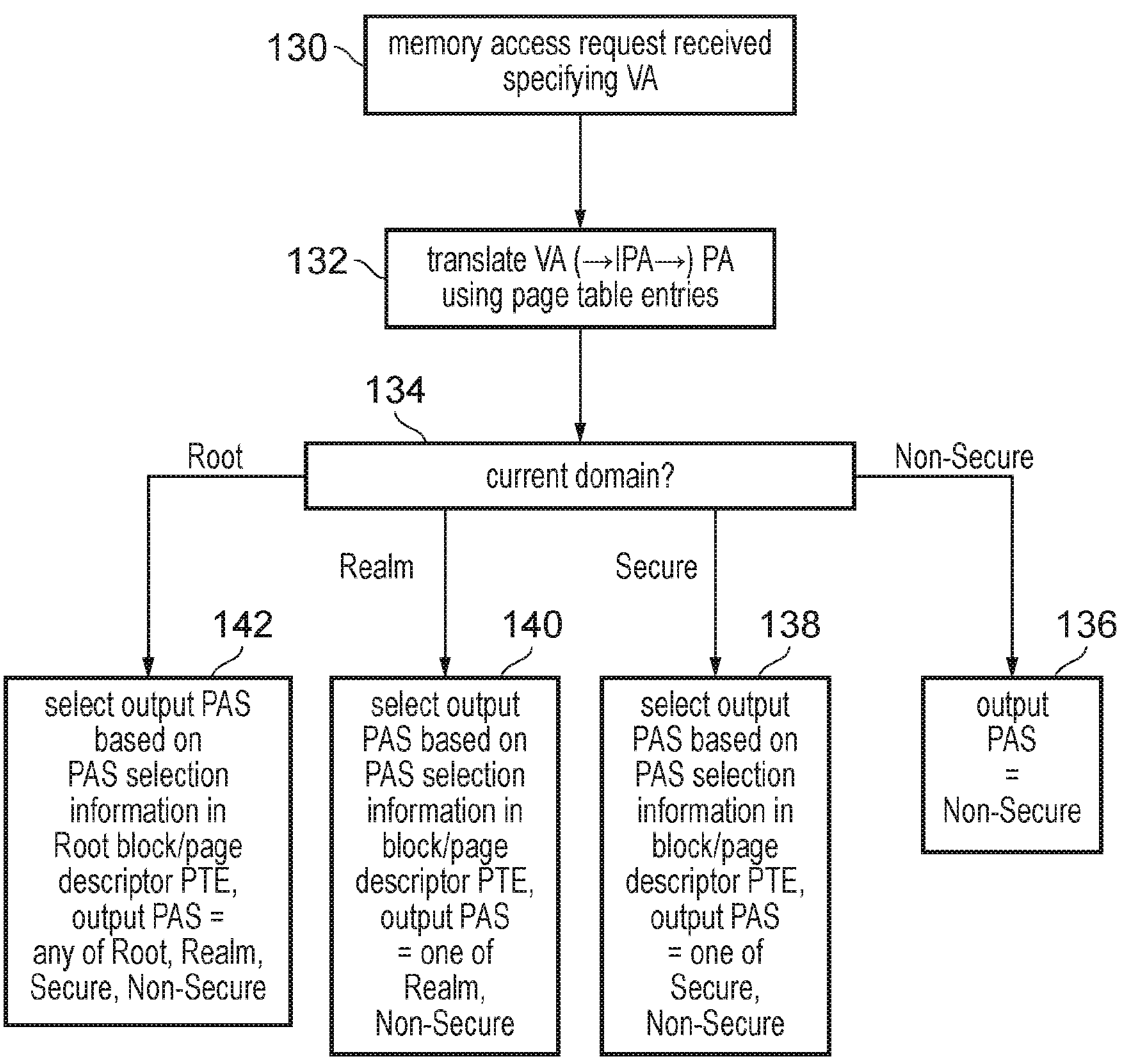
Figure 9:
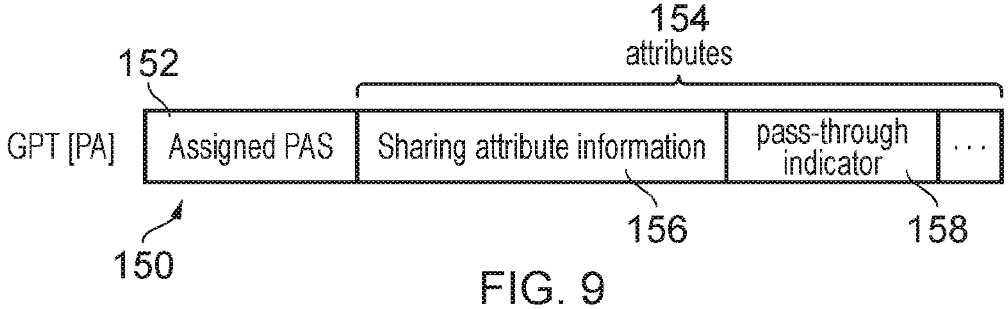
Figure 10:
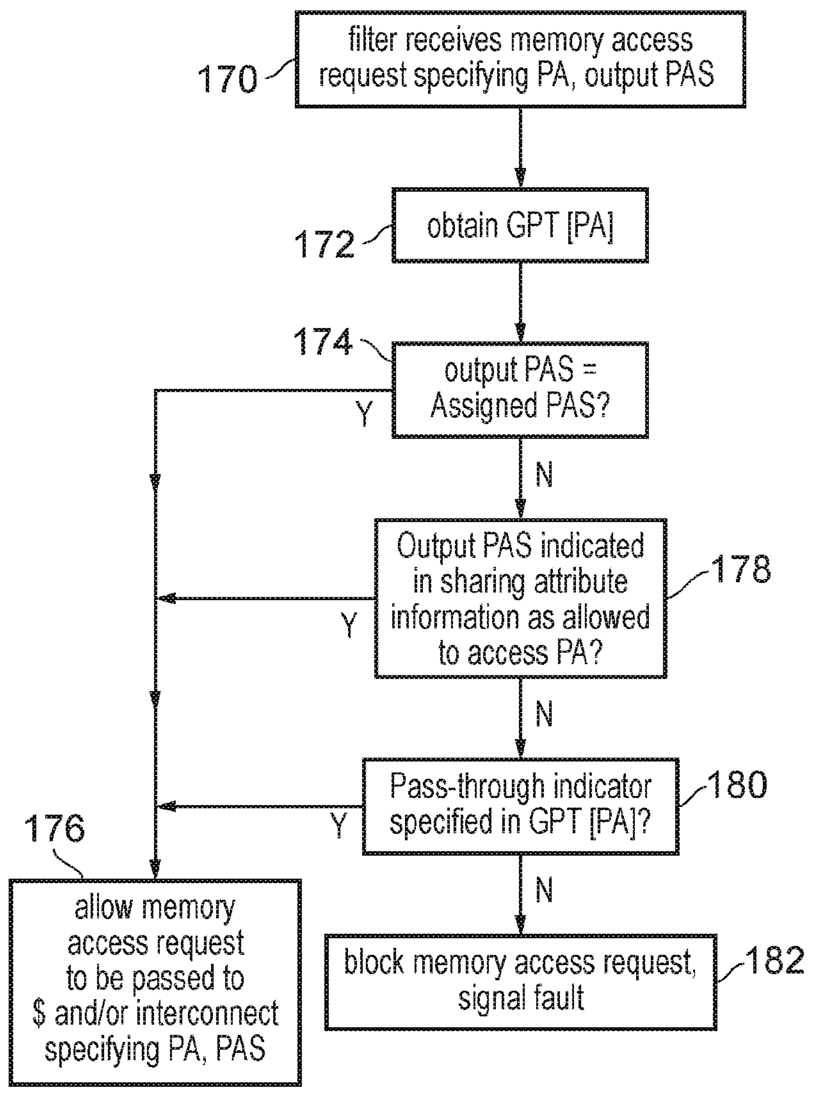
Figure 11:
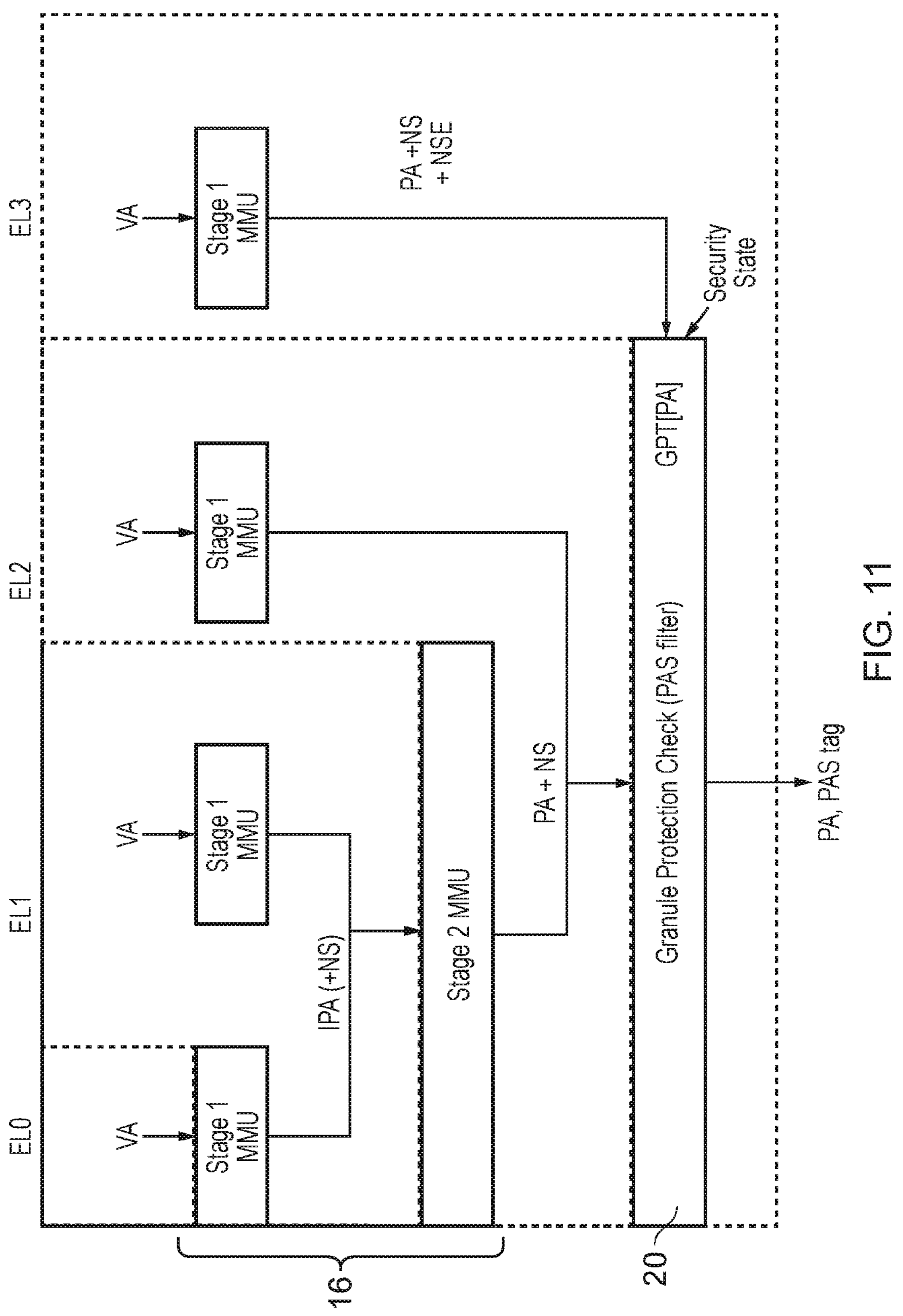
Figure 12:
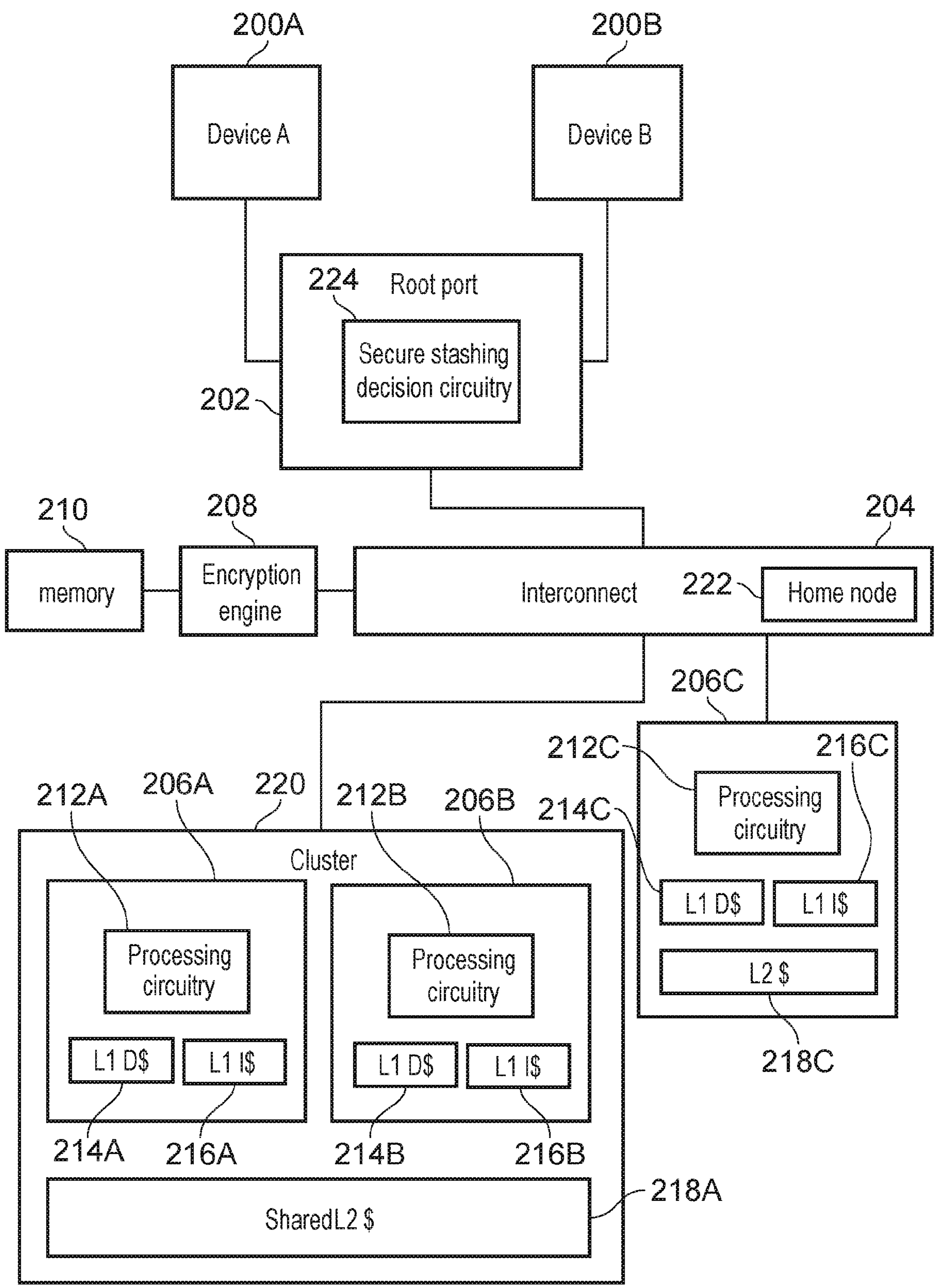
Figure 13:
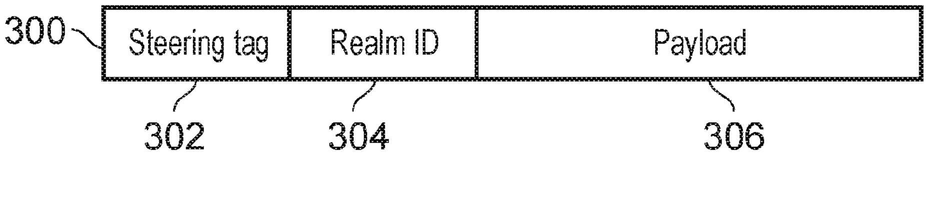
Figure 14:
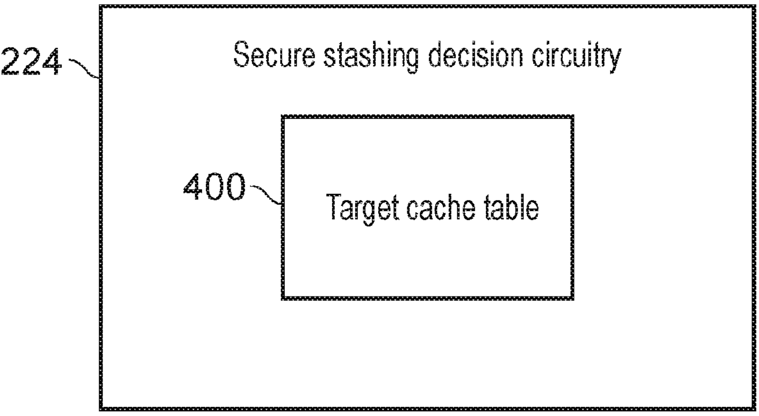
Figure 17:
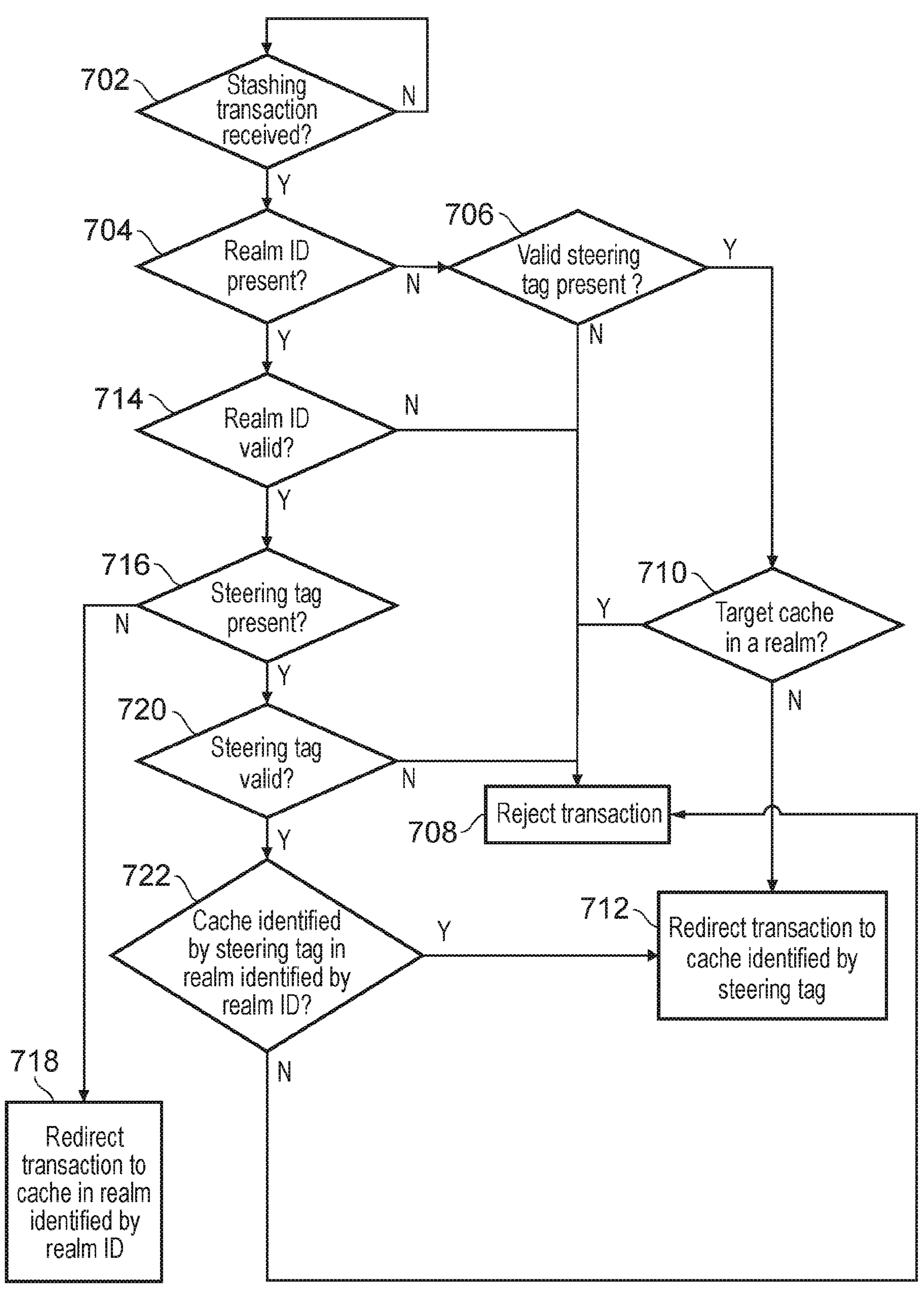
Figure 18:
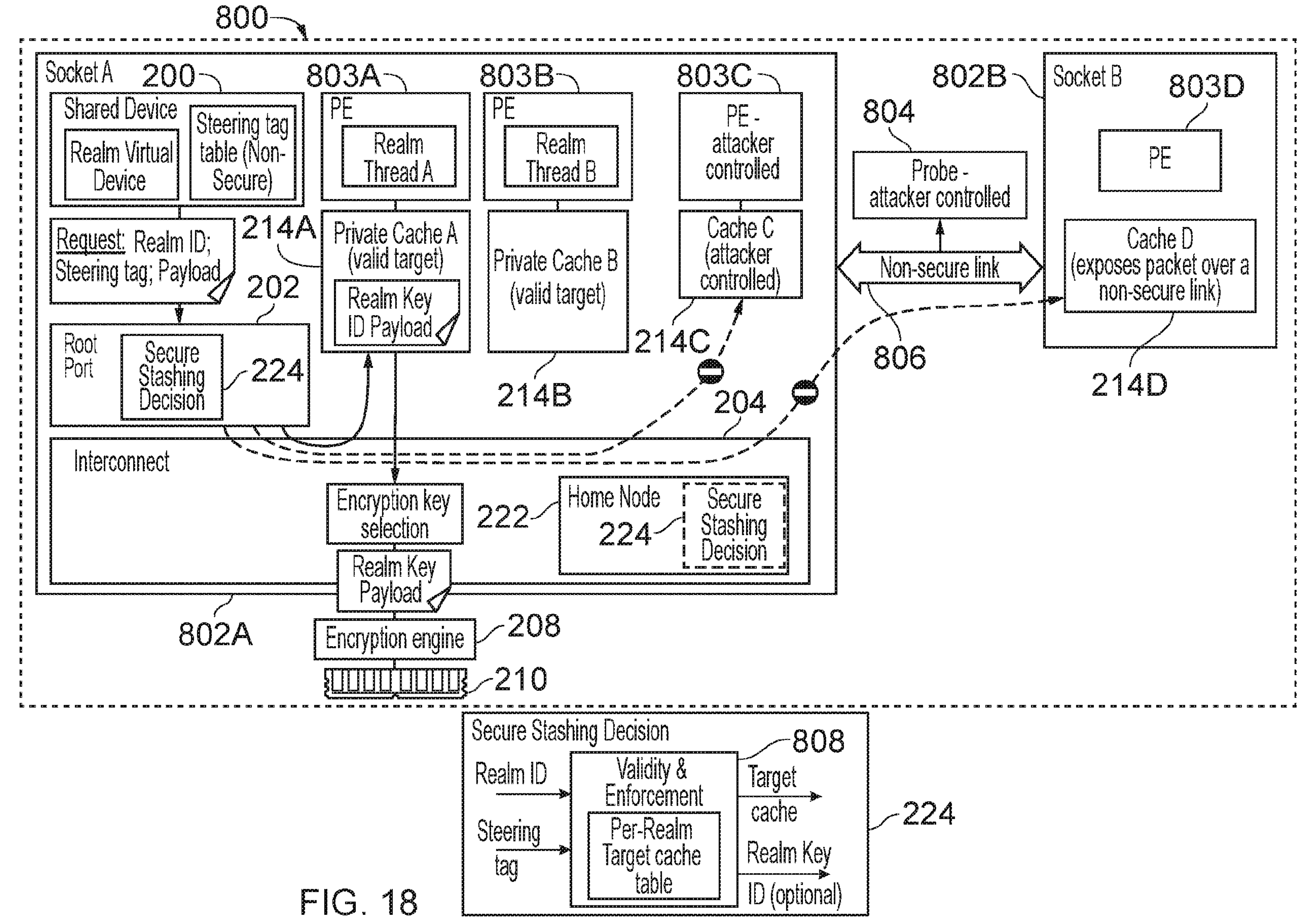

FIG. 4 schematically illustrates aliasing of a number of physical address spaces onto a system physical address space identifying locations in the memory system;

FIG. 5 illustrates an example of partitioning the effective hardware physical address space so that different architectural physical address spaces have access to respective portions of the system physical address space;

FIG. 6 is a flow diagram illustrating a method of determining the current domain of operation of the processing circuitry;

FIG. 7 shows examples of page table entry formats for page table entries used for translating virtual addresses to physical addresses;

FIG. 8 is a flow diagram showing a method of selecting a physical address space to be accessed by a given memory access request;

FIG. 9 illustrates an example of an entry of a granule protection table for providing granule protection information indicating which physical address spaces are allowed to access a given physical address;

FIG. 10 is a flow diagram showing a method of performing a granule protection lookup;

FIG. 11 illustrates a number of stages of address translation and granule protection information filtering;

FIG. 12 illustrates an example of a data processing system comprising a plurality of nodes connected via an interconnect;

FIG. 13 illustrates an example of a stashing transaction;

FIG. 14 illustrates an example of secure stashing decision circuitry:

FIG. 15 illustrates an example of a target cache table which may be stored in the secure stashing decision circuitry;

FIG. 16 is a diagram illustrating examples of how the secure stashing decision circuitry may treat a stashing transaction in dependence on a steering tag and realm ID;

FIG. 17 is a flow diagram showing a method of handling a stashing transaction; and FIG. 18 illustrates an example of an integrating circuit which has secure stashing decision circuitry.

Before discussing the embodiments with reference to the accompanying figures, the following description of example embodiments and associated advantages is provided.

In accordance with one example configuration there is provided an apparatus comprising interconnect circuitry to couple a device to one or more processing elements, each processing element operating in a trusted execution environment. In addition, secure stashing decision circuitry is provided to receive stashing transactions from the device and to redirect permitted stashing transactions to a given storage structure accessible to at least one of the one or more processing elements. The secure stashing decision circuitry is further configured, in response to receiving a given stashing transaction, to determine whether the given stashing transaction comprises a trusted execution environment identifier associated with a given trusted execution environment, and to treat the given stashing transaction as a permitted stashing transaction when redirection requirements, dependent on the trusted execution environment identifier, are met.

In some systems—such as the data processing system described above, comprising at least one processing element coupled to at least one device via an interconnect—there may be a need for certain processes executed on either the processing elements(s) or the device(s) to execute securely, in isolation from other processes. Such systems may support operation in a number of trusted execution environments (also referred to as realms), each being associated with one or more regions in memory which may only be accessible to processes executing within that trusted execution environment. For example, a given processing element or device may operate within a trusted execution environment; alternatively, different processes executing on a given device or processing element may operate within different trusted execution environments.

The provision of trusted execution environments in this way allows processes within a given trusted execution environment to be executed securely, by preventing processes operating outside of the given trusted execution environment from accessing any data stored within a region of memory associated with the given trusted execution environment.

As discussed above, one or more devices in a data processing system may be capable of issuing memory access requests (also referred to as device transactions) to the interconnect, requesting access to a particular location in a memory accessible to the devices and to the one or more processing elements. For example, these may include write requests to write data to a target memory location, or read requests to read data from a target memory location. Typically, one would expect these device transactions to terminate in the memory system. For example, one would expect a write request to be completed by writing data to the target memory region. Therefore, in order for one of the processing elements to subsequently access that data, it will issue an access request of its own to retrieve the data from memory. There can be a significant latency associated with an access to memory such as this, since the memory may be separated from the processing element by a number of structures, such as the interconnect, which may introduce latency in retrieving the data. In addition, the memory can be large, meaning that further latency may be introduced as the memory address for the requested data is accessed in the memory.

The processing element may, therefore, have access to one or more storage structures (e.g. storage circuitry, such as a cache or other storage unit) which may, for example, store local copies of data that is also stored in memory. These storage structures—which may be separated from the memory by the interconnect, such that they are on the same side of the interconnect as at least one processing element—can allow the processing element to access data without needing to access memory. This can provide a significant performance improvement, by reducing the latency involved in accessing data. For example, the storage structure may be the same side of the interconnect as the processing element, so that the data can be retrieved without needing to send signals via the interconnect circuitry. In addition, the storage structure can be made significantly smaller than the memory, so that the data being requested can be accessed more quickly.

However, when the data in memory is updated—for example, due to a transaction issued by a device—the local copy (or copies) of that data stored in the one or more storage structures will no longer be up to date. This means that the processing element will need to retrieve the data from memory the next time it needs to access it. Accordingly, when a memory location is updated in response to a device transaction, there can be a knock-on effect on the performance of other processing elements having access to that memory location.

The apparatus of the present technique seeks to address this issue by allowing some device transactions to be redirected to a given storage structure accessible to at least one processing element. These device transactions—referred to as "stashing transactions" as they cause data to be "stashed" in a given storage structure—thus terminate in the given storage structure, rather than terminating in memory. This allows subsequent accesses to that data by the at least one processing element to be performed with reduced latency, because the data can be retrieved from the given storage structure, instead of from memory.

However, the inventors of the present technique realised that this could introduce a potential security vulnerability if the storage structure to which the stashing transaction is redirected is within (e.g. accessible to) a different trusted execution environment to the trusted execution environment of the device (or the process executing on the device) which issued the transaction. This may lead to untrusted processes (e.g. from the point of view of the programmer of the process executing on the device) being able to access sensitive data relating to the process executing on the device.

Therefore, to provide improved security, secure stashing decision circuitry is provided to receive stashing transactions from a device and redirect permitted stashing transactions to a given storage structure accessible to at least one of one or more processing elements.

The device and the one or more processing elements are coupled (e.g. connected) via interconnect circuitry, at least one of the processing elements operating in a trusted execution environment. Moreover, the stashing transactions received by the secure stashing decision circuitry may comprise a trusted execution environment identifier (e.g. realm ID) associated with a particular trusted execution environment (e.g. realm). The secure stashing decision circuitry is arranged, for a given stashing transaction, to check whether the given stashing transaction comprises a trusted execution environment identifier, and to treat the given stashing transaction as a permitted stashing transaction in the event that redirection requirements—dependent on the trusted execution identifier—are met. For example, the redirection requirements can be based on whether or not the given stashing transaction comprises a trusted execution environment identifier and/or based on the value of the trusted execution identifier of the given transaction.

Accordingly, the present technique provides improved performance without compromising the security of the system. In particular, allowing at least some stashing transactions to be redirected to a storage structure accessible to a given processing element can improve the performance of the system by reducing the latency associated with subsequent accesses to data stored in response to the transaction. In addition, by only allowing permitted stashing transactions—which satisfy redirection requirements dependent on the trusted execution identifier—to be redirected, the security of the system can be improved.

In some examples, each of the stashing transactions comprises a request to access data associated with a location in memory. For example, the memory may be a separate structure from the given storage structure, and may be separated from the one or more processing elements and the given storage structure by a number of components, including for example the interconnect circuitry. Accordingly, accesses to memory are likely to incur increased latency over accesses to the given storage structure. Hence, by redirecting permitted stashing transactions so that they trigger accesses to the given storage structure rather than the location in memory identified by the transaction can lead to a decrease in latency if the processing element subsequently accesses the data associated with that memory location. This, in turn, can lead to an improvement in performance.

In some examples, the stashing transactions may comprise a write request to write data to a location associated with a location in memory, and the secure stashing decision circuitry may be configured to cause the data to be written to the given storage structure when the redirection requirements are met. In this way, by writing the data to the given storage structure instead of writing the data to the location in memory, the latency associated with subsequent accesses to that data by the processing element(s) having access to that storage structure can be reduced, leading to an improvement in performance.

It might seem counterintuitive to allow the data to be written directly to the given storage structure, especially given that at least one processing element having access to the given storage structure is operating in a trusted execution environment—to a skilled person, allowing an external device to write data directly to a storage structure accessible to processing elements within a trusted execution environment might appear to potentially compromise the security of the system. However, the inventors realised that, by providing secure stashing decision circuitry to check whether the stashing transaction comprises a trusted execution environment identifier, and to only redirect the stashing transaction to the given storage structure when certain redirection criteria are met, the performance benefits of redirecting stashing transactions can be achieved without significantly affecting the security of the system.

In some examples, whether the redirection requirements are met is dependent on at least one of whether the trusted execution environment identifier is present, and the value of the trusted execution environment identifier. For example, whether the redirection requirements are met may be dependent on the value of the trusted execution environment identifier, unless the trusted execution environment identifier is absent. It will be appreciated that the redirection requirements may be further dependent on other factors, in addition to conditions relating to the trusted execution environment identifier; for example, whether the redirection requirements are met may be at least partially dependent on whether a memory location targeted by the stashing transaction is within a trusted execution environment.

In some examples, the secure stashing decision circuitry is configured, when the given storage structure is in a trusted execution environment, to reject the given stashing transaction when the trusted execution environment identifier is absent or invalid. For example, if the given stashing transaction does not indicate a valid trusted execution environment identifier, the stashing transaction may—if the given storage structure is in a trusted execution environment—be rejected. This can provide improved security by ensuring that only stashing transactions from trusted devices—e.g. those devices operating within a trusted execution environment—are permitted to access storage structures within a trusted execution environment.

In some examples, the secure stashing decision circuitry is configured, in response to rejecting the given stashing transaction, to assert an error signal. For example, the asserted error signal may cause an error to be recorded (e.g. logged) in a set of error log registers. The error log registers may be located within the interconnect circuitry, for example, and may hold a record of previous errors—including previous stashing transactions rejected by the secure stashing decision circuitry. In a particular example, if the device is connected to the interconnect via a root port, the error log registers may be located within the root port.

In some examples, the given storage structure is selected in dependence on the permitted stashing transaction. For example, the given storage structure may be identified based on a memory location indicated by the transaction, the trusted execution identifier indicated by the transaction (if present) and/or some other identifier indicated by the transaction.

In some examples, the secure stashing decision circuitry is configured to determine whether the given stashing transaction comprises a steering tag indicative of the given storage structure, and when the secure stashing decision circuitry determines that the given stashing transaction comprises the steering tag, whether the redirection requirements are met is further dependent on the steering tag. Accordingly, the steering tag may provide a mechanism allowing at least some transactions issued by the device to be stashed in (e.g. redirected to) a storage structure accessible to a processing element, instead of being directed to memory. As discussed above, allowing stashing transactions to be redirected to a storage structure accessible to one or more processing elements provides significant performance benefits, in terms of reduced latency associated with subsequent accesses by the processing element(s) to that data.

In some examples, the secure stashing decision circuitry is configured to reject the given stashing transaction when the given storage structure is in a first trusted execution environment and the trusted execution environment identifier is absent or invalid, and/or the given storage structure is in a first trusted execution environment and the trusted execution environment identifier is associated with a different trusted execution environment, and/or the steering tag is invalid. By this approach, the performance benefits associated with the provision of a steering tag can be achieved without compromising the security of the system. In particular, this example provides three conditions which could trigger the rejection of a stashing transaction:

1. The given storage structure is in a first trusted execution environment and the trusted execution environment identifier is absent or invalid. This condition protects against accesses to the given storage structure by processes whose identity and/or security credentials are unspecified. If a valid trusted execution identifier is not specified, it may be difficult for the secure stashing decision circuitry to determine whether it is safe to permit access by the given stashing transaction to the given storage structure, and thus the safest approach may be to reject the stashing transaction.
2. The given storage structure is in a first trusted execution environment and the trusted execution environment identifier is associated with a different trusted execution environment. This condition protects against accesses to the given storage structure by processes who are executing outside of the trusted execution environment in which the given storage structure is provided. This can improve security by keeping the processes operating within the first trusted execution environment isolated from processes outside of that environment, who may be untrusted from the perspective of the processes in the first trusted execution environment. Moreover, data associated with the trusted execution environment in which the device is executing are similarly protected from access by processes in the first trusted execution environment. Whether or not this condition is met could, for example, be determined based on a comparison of the steering tag and the trusted execution environment identifier.
3. The steering tag is invalid. This condition may be applied for any of a number of reasons. For example, it may be difficult for the secure stashing decision circuitry to determine the identity of the given storage structure if the steering tag is invalid, so the stashing transaction may be rejected to avoid the data being mistakenly written to the wrong storage structure.

It will be appreciated that the above conditions may be applied in any combination and still provide notable security improvements (for the reasons set out above). For example, any one of the above conditions could be provided in isolation, and still provide the security benefits set out above for that particular condition. Alternatively, any combination of two of the three conditions may be provided, or indeed all three conditions may be provided.

In some examples, the given storage structure is selected in dependence on a value of the trusted execution environment identifier, and/or a value of the steering tag. For example, if a valid steering tag is present, the given storage structure may be identified by the steering tag. On the other hand, the given storage structure may be determined based on the trusted execution environment instead. This can be advantageous, as it provides more flexibility in how the given storage structure is identified.

In some particular examples, the secure stashing decision circuitry is configured to select the given storage structure in dependence on the value of the steering tag unless the steering tag is absent. For example, if no steering tag is present, the given storage structure may be determined to be a storage structure within the trusted execution environment identified by the trusted execution environment identifier. Accordingly, the trusted execution environment identifier can—in some systems—provide the additional advantage of negating the need for a steering tag. This can be useful, since encoding space within a transaction may be limited, and removing the steering tag may free up encoding space for other purposes.

It can be useful to protect data associated with a trusted execution environment by encrypting it using an encryption key accessible only to processes operating in the trusted execution environment. By encrypting the data, even if an attacker manages to obtain the data, they will be unable to interpret it without also obtaining the encryption key. Accordingly, it can be useful to be able to identify an encryption key identifier in dependence on the trusted execution environment identifier, to enable the encryption key for the data to be identified. Thus, in some examples, the given stashing transaction comprises a request to access data at a given location in memory, and the secure stashing decision circuitry is configured to identify, based on the trusted execution environment identifier, an encryption key identifier indicative of an encryption key for encrypting the data stored at the given location in memory.

In some examples, when the stashing transactions comprise a write request to write data to a location associated with a location in memory, the secure stashing decision circuitry may be configured to cause the encryption key identifier and the data to be written to the given storage structure. For example, the encryption key identifier could be stored alongside the data in the given storage structure, so that if that data is subsequently stored to memory (e.g. due to being evicted from the storage structure) the encryption key can be found and used to encrypt the data. However, it will be appreciated that it is not essential for the encryption key identifier to be stored in the given storage structure with the data: for example, the encryption key identifier can instead be looked up, using the trusted execution identifier, as and when it is needed (e.g. when the data is evicted from the given storage structure). Also, for example, if the given storage structure is entirely within a single trusted execution environment (e.g. the given storage structure only holds data associated with a single trusted execution environment), the encryption key identifier may not be needed at all, since it may be implicit that any data stored in the given storage structure is encrypted using the encryption key or keys associated with that single trusted execution environment.

In some examples, the given storage structure comprises a cache. A cache is typically a local storage structure, separate from memory, that is provided closer (logically) to one or more processing elements in the system than the memory. Hence, it is often significantly quicker (e.g. associated with a lower latency) to access a cache than it is to access the memory. Further, a cache may be significantly smaller than the memory, so looking up the required data in a cache may be significantly quicker. Hence, copies of some data in memory (e.g. data which is frequently accessed) may be held in one or more caches so that it can be accessed with reduced latency. Allowing stashing transactions to access data in a cache rather than memory can, therefore, lead to improved performance by reducing the latency associated with subsequent accesses to that data.

In a processing system, multiple levels of cache may be provided within a memory hierarchy, with some (typically, but not necessarily, smaller) caches provided closer to a processing element and other (typically, but not necessarily, larger) caches—which may be shared between multiple processing elements—being provided closer to the memory. Copies of data at a particular memory location may be held in multiple caches. For example, a data item may be held in both a level 1 cache close to a processing element and in a larger level 2 cache, closer to the memory, so that if the data is evicted from the level 1 cache, it can still be accessed reasonably quickly from the level 2 cache, instead of the processing element needing to retrieve the data from memory. This is known as cache inclusivity. However, this can present security issues if some caches are shared between multiple processing elements: if not all of these processing elements operate within the same trusted execution environment, it may not be desirable to store data associated with one trusted execution environment in a cache which is also accessible to processes executing in other execution environments. Even if the data is encrypted, or held in a portion of the shared cache which is inaccessible to processes in other trusted execution environments, this may still present a security risk. For example, an attacker may be able to determine whether or not data is stored in a particular entry of a cache simply based on how quickly an access request to that entry is rejected. This could give an attacker an indication of which memory locations have recently been accessed by a given process in a different trusted execution environment which could, in some circumstances, be enough to compromise the security of the system.

Accordingly, it can be useful to be able to control cache inclusivity—e.g. to control whether copies of a given item of data are stored in multiple caches or in just one cache—in dependence on the trusted execution environment identifier indicated by a given stashing transaction. This can provide improved security by preventing processes in other trusted execution environments from being able to access the data, or make any assumptions based on the presence of that data in the cache. Therefore, in some examples, the secure stashing decision circuitry is configured to control, based on the trusted execution environment identifier, whether at least one given cache line of the cache is permitted to also be held in at least one other cache.

In some examples, the apparatus comprises a root port provided at a first level of devices within a hierarchical structure of devices, the device being provided within the hierarchical structure of devices and being coupled to the interconnect via the root port. There are many ways in which the device may be coupled to the interconnect, but one example is to provide a root port between the device and the interconnect. This can be particularly useful in a network comprising a large number of devices, since it allows the devices to be arranged in a hierarchical structure, with one or more root ports being provided at a first level of the hierarchy (e.g. closest to the interconnect). The device of the present technique may be connected directly to the root port (e.g. in the second level of the hierarchy) or may be connected to the root port via one or more other intervening devices.

In some examples, the device comprises a requester device within a packet network, the requester device being configured to transmit the stashing transactions to the root port in accordance with a packet protocol of the packet network, for onward propagation to the interconnect. A packet network is a particular type of network within which the device may be provided. However, it will be appreciated that the present technique is applicable in any type of network where the device is coupled to one or more processing elements via interconnect circuitry.

In some examples, the packet protocol may comprise the Peripheral Component Interconnect Express (PCIe) protocol. PCIe is a widely-used packet protocol, and it is thus clearly advantageous for the present technique to be applicable within this standard. However, it will be appreciated that the present technique is not limited to application within this standard, and can in fact be applied within any type of network where the device is coupled to one or more processing elements via interconnect circuitry.

In some examples, the root port comprises the secure stashing decision circuitry. There are many potential locations between the device and the one or more processing elements for the secure stashing decision to be located, but one possibility is to provide this circuitry within the root port.

In some examples, the interconnect comprises home node circuitry responsible for controlling access to a portion of memory, and the home node circuitry comprises the secure stashing decision circuitry. Thus, another possible location for the secure stashing decision circuitry is within the interconnect itself, and in such an example implementation the secure stashing decision circuitry may be provided within a home node of the interconnect.

It will be appreciated that the root node and the home node are both just examples of where the secure stashing decision circuitry could be located, in order to allow the present technique to be applied within certain existing systems. However, it will be appreciated that in other examples, the secure stashing decision circuitry can be provided in other locations.

Example embodiments of the present technique will now be described with referenced to the figures.

Figure 1:
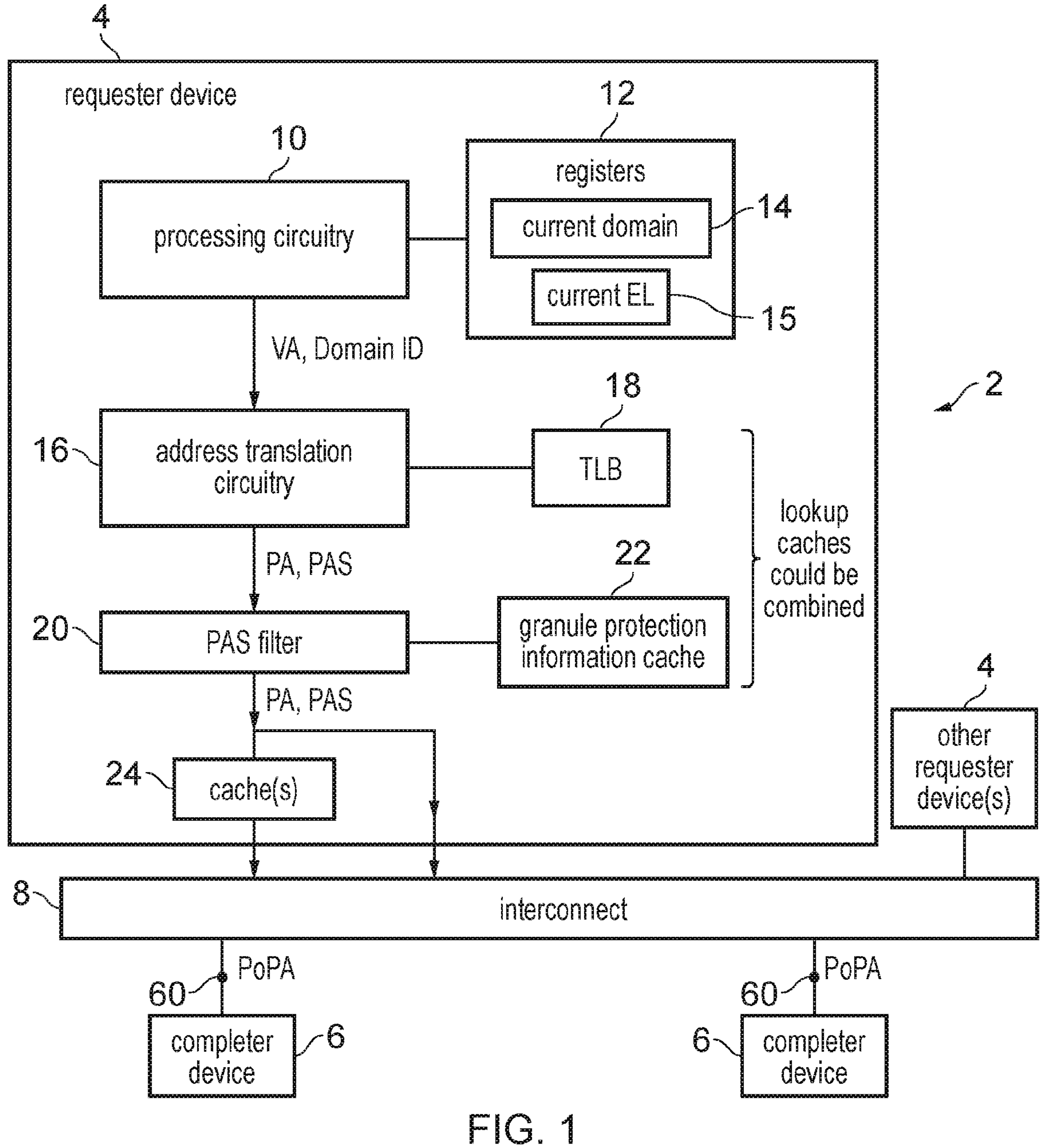
FIG. 1 illustrates an example of a data processing apparatus.

FIG. 1 schematically illustrates an example of a data processing system 2 having at least one requester device 4 and at least one completer device 6. An interconnect 8 provides communication between the requester devices 4 and completer devices 6. A requester device is capable of issuing memory access requests requesting a memory access to a particular addressable memory system location. A completer device 6 is a device that has responsibility for servicing memory access requests directed to it. Although not shown in FIG. 1, some devices may be capable of acting both as a requester device and as a completer device. The requester devices 4 may for example include processing elements such as a central processing unit (CPU) or graphics processing unit (GPU) or other master devices such as bus master devices, network interface controllers, display controllers, etc. The completer devices may include memory controllers responsible for controlling access to corresponding memory storage units, peripheral controllers for controlling access to a peripheral device, etc. FIG. 1 shows an example configuration of one of the requester devices 4 in more detail but it will be appreciated that the other requester devices 4 could have a similar configuration. Alternatively, the other requester devices may have a different configuration to the requester device 4 shown on the left of FIG. 1.

The requester device 4 has processing circuitry 10 for performing data processing in response to instructions, with reference to data stored in registers 12. The registers 12 may include general purpose registers for storing operands and results of processed instructions, as well as control registers for storing control data for configuring how processing is performed by the processing circuitry. For example the control data may include a current domain indication 14 used to select which domain of operation is the current domain, and a current exception level indication 15 indicating which exception level is the current exception level in which the processing circuitry 10 is operating.

The processing circuitry 10 may be capable of issuing memory access requests specifying a virtual address (VA) identifying the addressable location to be accessed and a domain identifier (Domain ID or 'security state') identifying the current domain. Address translation circuitry 16 (e.g. a memory management unit (MMU)) translates the virtual address into a physical address (PA) through one of more stages of address translation based on page table data defined in page table structures stored in the memory system. A translation lookaside buffer (TLB) 18 acts as a lookup cache for caching some of that page table information for faster access than if the page table information had to be fetched from memory each time an address translation is required. In this example, as well as generating the physical address, the address translation circuitry 16 also selects one of a number of physical address spaces associated with the physical address and outputs a physical address space (PAS) identifier identifying the selected physical address space. Selection of the PAS will be discussed in more detail below.

A PAS filter 20 acts as requester-side filtering circuitry for checking, based on the translated physical address and the PAS identifier, whether that physical address is allowed to be accessed within the specified physical address space identified by the PAS identifier. This lookup is based on granule protection information stored in a granule protection table structure stored within the memory system. The granule protection information may be cached within a granule protection information cache 22, similar to a caching of page table data in the TLB 18. While the granule protection information cache 22 is shown as a separate structure from the TLB 18 in the example of FIG. 1, in other examples these types of lookup caches could be combined into a single lookup cache structure so that a single lookup of an entry of the combined structure provides both the page table information and the granule protection information. The granule protection information defines information restricting the physical address spaces from which a given physical address can be accessed, and based on this lookup the PAS filter 20 determines whether to allow the memory access request to proceed to be issued to one or more caches 24 and/or the interconnect 8. If the specified PAS for the memory access request is not allowed to access the specified physical address then the PAS filter 20 blocks the transaction and may signal a fault.

While FIG. 1 shows an example with a system having multiple requester devices 4, the features shown for the one requester device on the left hand side of FIG. 1 could also be included in a system where there is only one requester device, such as a single-core processor.

While FIG. 1 shows an example where selection of the PAS for a given request is performed by the address translation circuitry 16, in other examples information for determining which PAS to select can be output by the address translation circuitry 16 to the PAS filter 20 along with the PA, and the PAS filter 20 may select the PAS and check whether the PA is allowed to be accessed within the selected PAS.

The provision of the PAS filter 20 helps to support a system which can operate in a number of domains of operation each associated with its own isolated physical address space where, for at least part of the memory system (e.g. for some caches or coherency enforcing mechanisms such as a snoop filter), the separate physical address spaces are treated as if they refer to completely separate sets of addresses identifying separate memory system locations, even if addresses within those address spaces actually refer to the same physical location in the memory system. This can be useful for security purposes.

Figure 2:
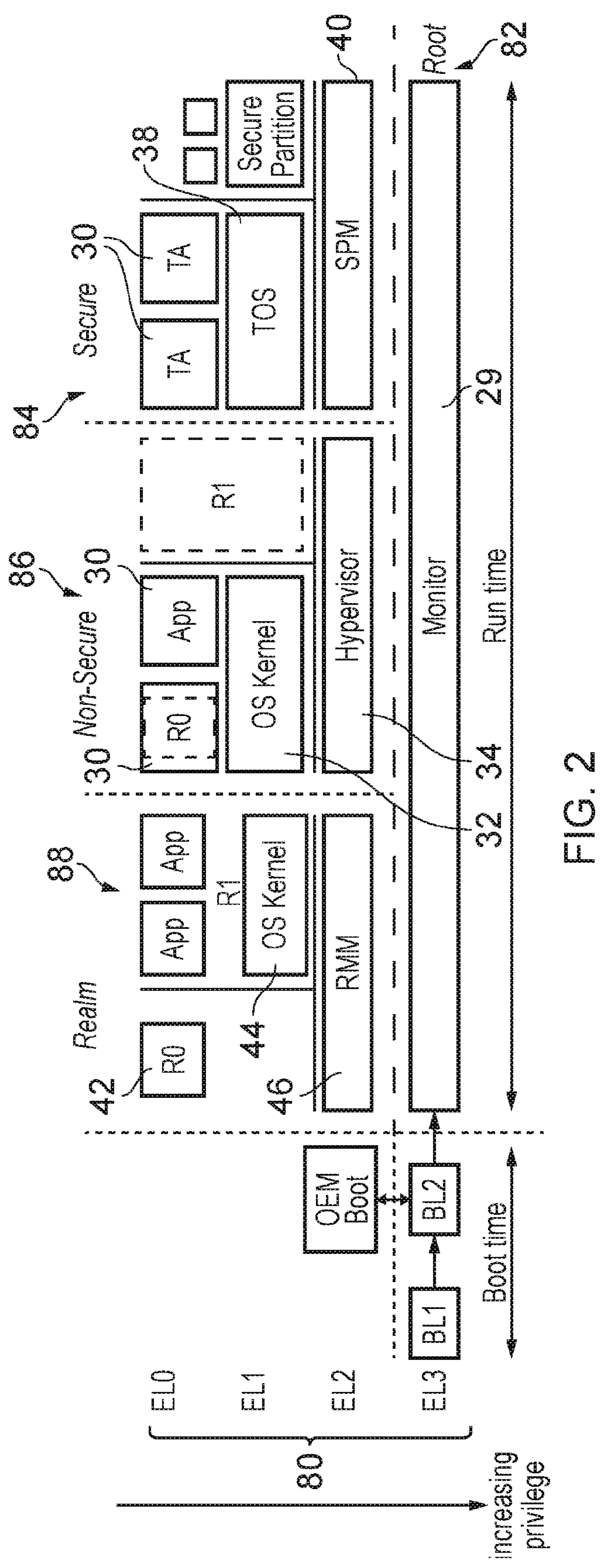
FIG. 2 illustrates a number of domains in which processing circuitry can operate.

FIG. 2 shows an example of different operating states and domains in which the processing circuitry 10 can operate, and an example of types of software which could be executed in the different exception levels and domains (of course, it will be appreciated that the particular software installed on a system is chosen by the parties managing that system and so is not an essential feature of the hardware architecture).

The processing circuitry 10 is operable at a number of different exception levels 80, in this example four exception levels labelled EL0, EL1, EL2 and EL3, where in this example EL3 refers to the exception level with the greatest level of privilege while EL0 refers to the exception level with the least privilege. It will be appreciated that other architectures could choose the opposite numbering so that the exception level with the highest number could be considered to have the lowest privilege. In this example the least privileged exception level EL0 is for application-level code, the next most privileged exception level EL1 is used for operating system-level code, the next most privileged exception level EL2 is used for hypervisor-level code which manages switching between a number of virtualised operating systems, while the most privileged exception level EL3 is used for monitor code which manages switches between respective domains and allocation of physical addresses to physical address spaces, as described later.

When an exception occurs while processing software in a particular exception level, for some types of exceptions, the exception is taken to a higher (more privileged) exception level, with the particular exception level in which the exception is to be taken being selected based on attributes of the particular exception which occurred. However, it may be possible for other types of exceptions to be taken at the same exception level as the exception level associated with the code being processed at the time an exception was taken, in some situations. When an exception is taken, information characterising the state of the processor at the time the exception was taken may be saved, including for example the current exception level at the time the exception was taken, and so once an exception handler has been processed to deal with the exception, processing may then return to the previous processing and the saved information can be used to identify the exception level to which processing should return.

In addition to the different exception levels, the processing circuitry also supports a number of domains of operation including a root domain 82, a secure (S) domain 84, a less secure domain 86 and a realm domain 88. For ease of reference, the less secure domain will be described below as the "non-secure" (NS) domain, but it will be appreciated that this is not intended to imply any particular level of (or lack of) security. Instead, "non-secure" merely indicates that the non-secure domain is intended for code which is less secure than code operating in the secure domain. The root domain 82 is selected when the processing circuitry 10 is in the highest exception level EL3. When the processing circuitry is in one of the other exception levels EL0 to EL2, the current domain is selected based on the current domain indicator 14, which indicates which of the other domains 84, 86, 88 is active. For each of the other domains 84, 86, 88 the processing circuitry could be in any of the exception levels EL0, EL1 or EL2.

At boot time, a number of pieces of boot code (e.g. BL1, BL2, OEM Boot) may be executed, e.g. within the more privileged exception levels EL3 or EL2. The boot code BL1, BL2 may be associated with the root domain for example and the OEM boot code may operate in the Secure domain. However, once the system is booted, at runtime the processing circuitry 10 may be considered to operate in one of the domains 82, 84, 86 and 88 at a time. Each of the domains 82 to 88 is associated with its own associated physical address space (PAS) which enables isolation of data from the different domains within at least part of the memory system. This will be described in more detail below.

The non-secure domain 86 can be used for regular application-level processing, and for the operating system and hypervisor activity for managing such applications. Hence, within the non-secure domain 86, there may be application code 30 operating at EL0, operating system (OS) code 32 operating at EL1 and hypervisor code 34 operating at EL2.

The secure domain 84 enables certain system-on-chip security, media or system services to be isolated into a separate physical address space from the physical address space used for non-secure processing. The secure and non-secure domains are not equal, in the sense that the non-secure domain code cannot access resources associated with the secure domain 84, while the secure domain can access both secure and non-secure resources. An example of a system supporting such partitioning of secure and non-secure domains 84, 86 is a system based on the TrustZone® architecture provided by Arm® Limited. The secure domain can run trusted applications 36 at EL0, a trusted operating system 38 at EL1, as well as optionally a secure partition manager 40 at EL2 which may, if secure partitioning is supported, use stage 2 page tables to support isolation between different trusted operating systems 38 executing in the secure domain 84 in a similar way to the way that the hypervisor 34 may manage isolation between virtual machines or guest operating systems 32 executing in the non-secure domain 86.

Extending the system to support a secure domain 84 has become popular in recent years because it enables a single hardware processor to support isolated secure processing, avoiding the need for the processing to be performed on a separate hardware processor. However, with the increasing popularity of use of the secure domain, many practical systems having such a secure domain now support, within the secure domain, a relatively sophisticated mixed environment of services which are provided by a wide range of different software providers. For example the code operating in the secure domain 84 may include different pieces of software provided by (among others): the silicon provider who manufactured the integrated circuit, an original equipment manufacturer (OEM) who assembles the integrated circuit provided by the silicon provider into an electronic device such as a mobile telephone, an operating system vendor (OSV) who provides the operating system 32 for the device; and/or a cloud platform provider who manages a cloud server supporting services for a number of different clients through the cloud.

However, increasingly there is a desire for parties providing user-level code (which might normally be expected to execute as applications 30 within the non-secure domain 86) to be provided with secure computing environments which can be trusted not to leak information to other parties operating code on the same physical platform. It may be desirable for such secure computing environments to be dynamically allocatable at runtime, and to be certified and attestable so that the user is able to verify whether sufficient security guarantee is provided on the physical platform, before trusting the device to process potentially sensitive code or data. A user of such software may not wish to trust the party providing a rich operating system 32 or hypervisor 34 which might normally operate in the non-secure domain 86 (or even if those providers themselves can be trusted, the user may wish to protect themselves against the operating system 32 or hypervisor 34 being compromised by an attacker). Also, while the secure domain 84 could be used for such user-provided applications needing secure processing, in practice this causes problems both for the user providing the code requiring the secure computing environment and for the providers of existing code operating within the secure domain 84. For the providers of existing code operating within the secure domain 84, the addition of arbitrary user-provided code within the secure domain would increase the attack surface for potential attacks against their code, which may be undesirable, and so allowing users to add code into the secure domain 84 may be strongly discouraged. On the other hand, the user providing the code requiring the secure computing environment may not be willing to trust all of the providers of the different pieces of code operating in the secure domain 84 to have access to its data or code, if certification or attestation of the code operating in a particular domain is needed as a prerequisite for the user-provided code to perform its processing, it may be difficult to audit and certify all of the distinct pieces of code operating in the secure domain 84 provided by the different software providers, which may limit the opportunities for third parties to provide more secure services.

Therefore, as shown in FIG. 2, an additional domain 88, called the realm domain, is provided which can be used by such user-introduced code to provide a secure computing environment orthogonal to any secure computing environment associated with components operating in the secure domain 24. In the realm domain, the software executed can include a number of realms, where each realm can be isolated from other realms by a realm management module (RMM) 46 operating at exception level EL2. The RMM 46 may control isolation between the respective realms 42, 44 executing the realm domain 88, for example by defining access permissions and address mappings in page table structures similar to the way in which hypervisor 34 manages isolation between different components operating in the non-secure domain 86. In this example, the realms include an application-level realm 42 which executes at EL0 and an encapsulated application/operating system realm 44 which executes across exception levels EL0 and EL1. It will be appreciated that it is not essential to support both EL0 and EL0/EL1 types of realms, and that multiple realms of the same type could be established by the RMM 46.

The realm domain 88 has its own physical address space allocated to it, similar to the secure domain 84, but the realm domain is orthogonal to the secure domain 84 in the sense that while the realm and secure domains 88, 84 can each access the non-secure PAS associated with the non-secure domain 86, the realm and secure domains 88, 84 cannot access each other's physical address spaces. This means that code executing in the realm domain 88 and secure domains 84 have no dependencies on each other. Code in the realm domain only needs to trust the hardware, the RMM 46 and the code operating in the root domain 82 which manages switching between domains, which means attestation and certification becomes more feasible. Attestation enables a given piece of software to request verification that code installed on the device matches certain anticipated properties. This could be implemented by checking whether a hash of the program code installed on the device matches an expected value that is signed by a trusted party using a cryptographic protocol. The RMM 46 and monitor code 29 could for example be attested by checking whether a hash of this software matches an expected value signed by a trusted party, such as the silicon provider who manufactured the integrated circuit comprising the processing system 2 or an architecture provider who designed the processor architecture which supports the domain-based memory access control. This can allow user-provided code 42, 44 to verify whether the integrity of the domain-based architecture can be trusted prior to executing any secure or sensitive functions.

Hence, it can be seen that the code associated with realms 42, 44, which would previously have executed in the non-secure domain 86 as shown by the dotted lines showing the gap in the non-secure domain where these processes would previously have executed, can now be moved to the realm domain where they may have stronger security guarantees because their data and code is not accessible by other code operating in a non-secure domain 86. However, due to the fact that the realm domain 88 and secure domain 84 are orthogonal and so cannot see each other's physical address spaces, this means that the providers of code in the realm domain do not need to trust the providers of code in the secure domain and vice versa. The code in the realm domain can simply trust the trusted firmware providing the monitor code 29 for the root domain 82 and the RMM 46, which may be provided by the silicon provider or the provider of the instruction set architecture supported by the processor, who may already inherently need to be trusted when the code is executing on their device, so that no further trust relationships with other operating system vendors, OEMs or cloud hosts are needed for the user to be able to be provided with a secure computing environment.

This can be useful for a range of applications and use cases, including for example mobile wallet and payment applications, gaming anti-cheating and piracy mechanisms, operating system platform security enhancements, secure virtual machine hosting, confidential computing, networking, or gateway processing for Internet of Things devices. It will be appreciated that users may find many other applications where the realm support is useful.

To support the security guarantees provided to a realm, the processing system may support an attestation report function, where at boot time or at run time measurements are made of firmware images and configuration, e.g. monitor code images and configuration or RMM code images and configuration and at runtime realm contents and configuration are measured, so that the realm owner can trace the relevant attestation report back to known implementations and certifications to make a trust decision on whether to operate on that system.

As shown in FIG. 2, a separate root domain 82 is provided which manages domain switching, and that root domain has its own isolated root physical address space. The creation of the root domain and the isolation of its resources from the secure domain allows for a more robust implementation even for systems which only have the non-secure and secure domains 86, 84 but do not have the realm domain 88, but can also be used for implementations which do support the realm domain 88. The root domain 82 can be implemented using monitor software 29 provided by (or certified by) the silicon provider or the architecture designer, and can be used to provide secure boot functionality, trusted boot measurements, system-on-chip configuration, debug control and management of firmware updates of firmware components provided by other parties such as the OEM. The root domain code can be developed, certified and deployed by the silicon provider or architecture designer without dependencies on the final device. In contrast the secure domain 84 can be managed by the OEM for implementing certain platform and security services. The management of the non-secure domain 86 may be controlled by an operating system 32 to provide operating system services, while the realm domain 88 allows the development of new forms of trusted execution environments which can be dedicated to user or third party applications while being mutually isolated from existing secure software environments in the secure domain 84.

Figure 3:
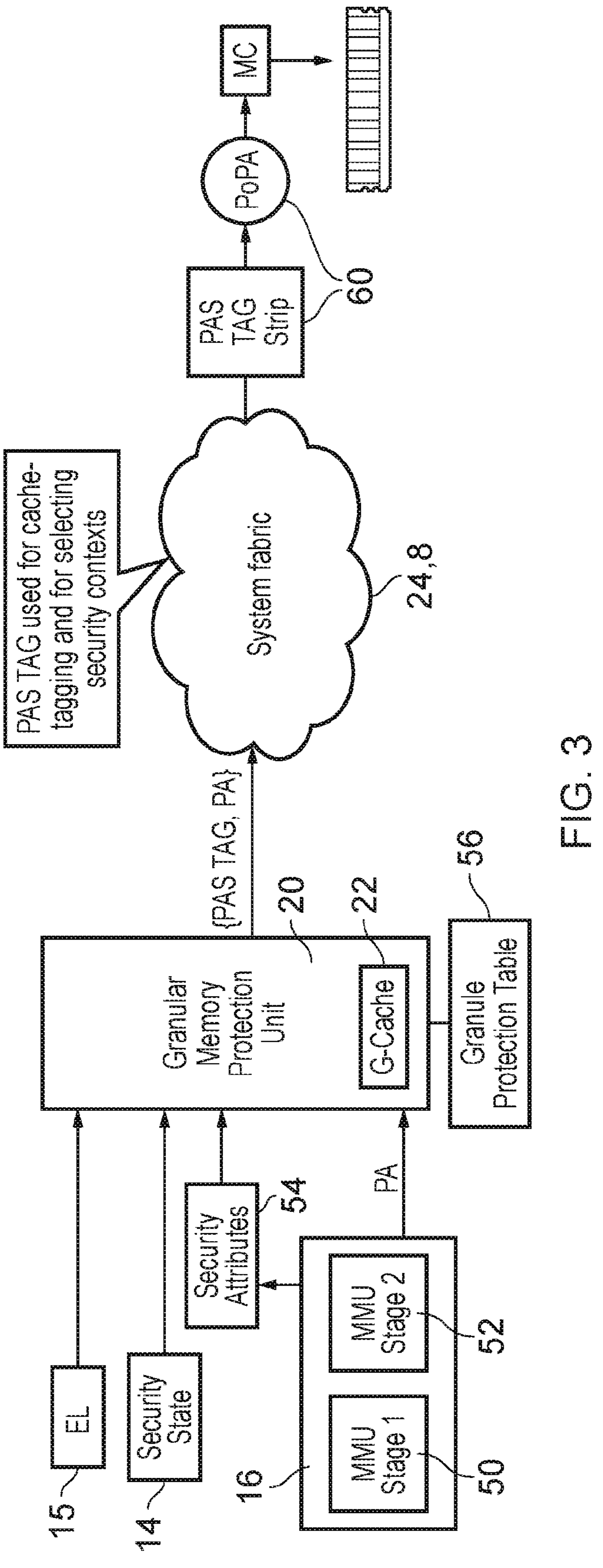
FIG. 3 illustrates an example of a processing system supporting granule protection lookups.

FIG. 3 schematically illustrates another example of a processing system 2 for supporting these techniques. Elements which are the same as in FIG. 1 are illustrated with the same reference numeral. FIG. 3 shows more detail in the address translation circuitry 16, which comprises stage 1 and stage 2 memory management units 50, 52. The stage 1 MMU 50 may be responsible for translating virtual addresses to either physical addresses (when the translation is triggered by EL2 or EL3 code) or to intermediate addresses (when the translation is triggered by EL0 or EL1 code in an operating state where a further stage 2 translation by the stage 2 MMU 52 is required). The stage 2 MMU may translate intermediate addresses into physical addresses. The stage 1 MMU may be based on page tables controlled by an operating system for translations initiated from EL0 or EL1, page tables controlled by a hypervisor for translations from EL2, or page tables controlled by monitor code 29 for translations from EL3. On the other hand, the stage 2 MMU 52 may be based on page table structures defined by a hypervisor 34, RMM 46 or secure partition manager 14 depending on which domain is being used. Separating the translations into two stages in this way allows operating systems to manage address translation for themselves and applications under the assumption that they are the only operating system running on the system, while the RMM 46, hypervisor 34 or SPM40 may manage isolation between different operating systems running in the same domain.

As shown in FIG. 3, the address translation process using the address translation circuitry 16 may return security attributes 54 which, in combination with the current exception level 15 and the current domain 14 (or security state), allow section of a particular physical address space (identified by a PAS identifier or "PAS TAG") to be accessed in response to a given memory access request. The physical address and PAS identifier may be looked up in a granule protection table 56 which provides the granule protection information described earlier. In this example the PAS filter 20 is shown as a granular memory protection unit (GMPU) which verifies whether the selected PAS is allowed to access the requested physical address and if so allows the transaction to be passed to any caches 24 or interconnect 8 which are part of the system fabric of the memory system.

The GMPU 20 allows assigning memory to separate address spaces while providing a strong, hardware-based, isolation guarantee and providing spatial and temporal flexibility in the assignment methods of physical memory into these address spaces, as well as efficient sharing schemes. As described earlier, the execution units in the system are logically partitioned to virtual execution states (domains or "Worlds") where there is one execution state (Root world) located at the highest exception level (EL3), referred to as the "Root World" that manages physical memory assignment to these worlds.

A single System physical address space is virtualized into multiple "Logical" or "Architectural" Physical Address Spaces (PAS) where each such PAS is an orthogonal address space with independent coherency attributes. A System Physical Address is mapped to a single "Logical" Physical Address Space by extending it with a PAS tag.

A given World is allowed access to a subset of Logical Physical Address Spaces. This is enforced by a hardware filter 20 that can be attached to the output of the Memory Management Unit 16.

A World defines the security attributes (the PAS tag) of the access using fields in the Translation Table Descriptor of the page tables used for address translation. The hardware filter 20 has access to a table (Granule Protection Table 56, or GPT) that defines for each page in the system physical address space granule protection information (GPI) indicating the PAS TAG it is associated with and (optionally) other Granule Protection attributes.

The hardware filter 20 checks the World ID and the Security Attributes against the Granule's GPI and decides if access can be granted or not, thus forming a Granular Memory Protection Unit (GMPU).

The GPT 56 can reside in on-chip SRAM or in off-chip DRAM, for example. If stored off-chip, the GPT 56 may be integrity-protected by an on-chip memory protection engine that may use encryption, integrity and freshness mechanisms to maintain security of the GPT 56.

Locating the GMPU 20 on the requester-side of the system (e.g. on the MMU output) rather than on the completer-side allows allocating access permissions in page granularity while permitting the interconnect 8 to continue hashing/striping the page across multiple DRAM ports.

Transactions remain tagged with the PAS TAG as they propagate throughout the system fabric 24, 8 until reaching a location defined as the Point of Physical Aliasing 60. This allows to locate the filter on the Master-side without diminishing the security guarantees comparing to Slave-side filtering. As the transaction propagates throughout the system, the PAS TAG can be used as an in-depth security mechanism for address isolation: e.g. caches can add the PAS TAG to the address tag in the cache, preventing accesses made to the same PA using the wrong PAS TAG from hitting in the cache and therefore improving side-channel resistance. The PAS TAG can also be used as context selector for a Protection Engine attached to the memory controller that encrypts data before it is written to external DRAM.

The Point of Physical Aliasing (PoPA) is a location in the system where the PAS TAG is stripped and the address changes back from a Logical Physical Address to a System Physical Address. The PoPA can be located below the caches, at the completer-side of the system where access to the physical DRAM is made (using encryption context resolved through the PAS TAG). Alternatively, it may be located above the caches to simplify system implementation at the cost of reduced security.

At any point in time, a world can request to transition a page from one PAS to another. The request is made to the monitor code 29 at EL3 which inspects the current state of the GPI. EL3 may only allow a specific set of transitions to occur (e.g. from Non-secure PAS to Secure PAS but not from Realm PAS to Secure PAS). To provide a clean transition, a new instruction is supported by the System—"Data Clean and Invalidate to the Point of Physical Aliasing" which EL3 can submit before transitioning a page to the new PAS—this guarantees that any residual state associated with the previous PAS is flushed from any caches upstream of (closer to the requester-side than) the PoPA 60.

Another property that can be achieved by attaching the GMPU 20 to the master side is efficient sharing of memory between worlds. It may be desirable to grant a subset of N worlds with shared access to a physical granule while preventing other worlds from accessing it. This can be achieved by adding a "restrictive shared" semantic to the Granule Protection Information, while forcing it to use a specific PAS TAG. As an example, the GPI can indicate that a physical Granule is can accessed only by "Realm World" 88 and "Secure World" 84 while being tagged with the PAS TAG of the Secure PAS 84.

An example of the above property is making fast changes in the visibility properties of a specific physical granule. Consider a case where each world is assigned with a private PAS that is only accessible to that World. For specific granules, the World can request to make them visible to the Non-Secure world at any point in time by changing their GPI from "exclusive" to "restrictive shared with Non-Secure world", and without changing the PAS association. This way, the visibility of that granule can be increased without requiring costly cache-maintenance or data copy operations.

FIG. 4 illustrates the concept of aliasing of the respective physical address spaces onto physical memory provided in hardware. As described earlier, each of the domains 82, 84, 86, 88 has its own respective physical address space 61.

At the point when a physical address is generated by address translation circuitry 16, the physical address has a value within a certain numeric range 62 supported by the system, which is the same regardless of which physical address space is selected. However, in addition to the generation of the physical address, the address translation circuitry 16 may also select a particular physical address space (PAS) based on the current domain 14 and/or information in the page table entry used to derive the physical address. Alternatively, instead of the address translation circuitry 16 performing the selection of the PAS, the address translation circuitry (e.g. MMU) could output the physical address and the information derived from the page table entry (PTE) which is used for selection of the PAS, and then this information could be used by the PAS filter or GMPU 20 to select the PAS.

The selection of PAS for a given memory access request may be restricted depending on the current domain in which the processing circuitry 10 is operating when issuing the memory access request, according to rules defined in the following table:

| Current Domain | Non-Secure PAS | Secure PAS | Realm PAS | Root PAS |
|---|---|---|---|---|
| Non-secure | Accessible | Inaccessible | Inaccessible | Inaccessible |
| Secure | Accessible | Accessible | Inaccessible | Inaccessible |
| Realm | Accessible | Inaccessible | Accessible | Inaccessible |
| Root | Accessible | Accessible | Accessible | Accessible |

For those domains for which there are multiple physical address spaces available for selection, the information from the accessed page table entry used to provide the physical address is used to select between the available PAS options.

Hence, at the point when the PAS filter 20 outputs a memory access request to the system fabric 24, 8 (assuming it passed any filtering checks), the memory access request is associated with a physical address (PA) and a selected physical address space (PAS).

From the point of view of memory system components (such as caches, interconnects, snoop filters etc.) which operate before the point of physical aliasing (PoPA) 60, the respective physical address spaces 61 are viewed as entirely separate ranges of addresses which correspond to different system locations within memory. This means that, from the point of view of the pre-PoPA memory system components, the range of addresses identified by the memory access request is actually four times the size of the range 62 which could be output in the address translation, as effectively the PAS identifier is treated as additional address bits alongside the physical address itself, so that depending on which PAS is selected the same physical address PAx can be mapped to a number of aliasing physical addresses 63 in the distinct physical address spaces 61. These aliasing physical addresses 63, all actually correspond to the same memory system location implemented in physical hardware, but the pre-PoPA memory system components treat aliasing addresses 63 as separate addresses. Hence, if there are any pre-PoPA caches or snoop filters allocating entries for such addresses, the aliasing addresses 63 would be mapped into different entries with separate cache hit/miss decisions and separate coherency management. This reduces likelihood or effectiveness of attackers using cache or coherency side channels as a mechanism to probe the operation of other domains.

The system may include more than one PoPA 60 (e.g. as shown in FIG. 14 discussed below). At each PoPA 60, the aliasing physical addresses are collapsed into a single de-aliased address 65 in the system physical address space 64. The de-aliased address 65 is provided downstream to any post-PoPA components, so that the system physical address space 64 which actually identifies memory system locations is once more of the same size as the range of physical addresses that could be output in the address translation performed on the requester side. For example, at the PoPA 60 the PAS identifier may be stripped out from the addresses, and for the downstream components the addresses may simply be identified using the physical address value, without specifying the PAS. Alternatively, for some cases where some completer-side filtering of memory access request is desired, the PAS identifier could still be provided downstream of the PoPA 60, but may not be interpreted as part of the address so that the same physical addresses appearing in different physical address spaces 60 would be interpreted downstream of the PoPA as referring to the same memory system location, but the supplied PAS identifier can still be used for performing any completer-side security checks.

FIG. 5 illustrates how the system physical address space 64 can be divided, using the granule protection table 56, into chunks allocated for access within a particular architectural physical address space 61. The granule protection table (GPT) 56 defines which portions of the system physical address space 65 are allowed to be accessed from each architectural physical address space 61. For example the GPT 56 may comprise a number of entries each corresponding to a granule of physical addresses of a certain size (e.g. a 4K page) and may define an assigned PAS for that granule, which may be selected from among the non-secure, secure, realm and root domains. By design, if a particular granule or set of granules is assigned to the PAS associated with one of the domains, then it can only be accessed within the PAS associated with that domain and cannot be accessed within the PASs of the other domains. However, note that while a granule allocated to the secure PAS (for instance) cannot be accessed from within the root PAS, the root domain 82 is nevertheless able to access that granule of physical addresses by specifying in its page tables the PAS selection information for ensuring that virtual addresses associated with pages which map to that region of physical addressed memory are translated into a physical address in the secure PAS instead of the root PAS. Hence, the sharing of data across domains (to the extent permitted by the accessibility/inaccessibility rules defined in the table described earlier) may be controlled at the point of selecting the PAS for a given memory access request.

However, in some implementations, in addition to allowing a granule of physical addresses to be accessed within the assigned PAS defined by the GPT, the GPT could use other GPT attributes to mark certain regions of the address space as shared with another address space (e.g. an address space associated with a domain of lower or orthogonal privilege which would not normally be allowed to select the assigned PAS for that domain's access requests). This can facilitate temporary sharing of data without needing to change the assigned PAS for a given granule. For example, in FIG. 5 the region 70 of the realm PAS is defined in the GPT as being assigned to the realm domain, so normally it would be inaccessible from the non-secure domain 86 because the non-secure domain 86 cannot select the realm PAS for its access requests. As the non-secure domain 26 cannot access the realm PAS, then normally non-secure code could not see the data in region 70. However, if the realm temporarily wishes to share some of its data in its assigned regions of memory with the non-secure domain then it could request that the monitor code 29 operating in the root domain 82 updates the GPT 56 to indicate that region 70 is to be shared with the non-secure domain 86, and this may make region 70 also be accessible from the non-secure PAS as shown on the left hand side of FIG. 5, without needing to change which domain is the assigned domain for region 70. If the realm domain has designated a region of its address space as shared with the non-secure domain, then although the memory access requests targeting that region which are issued from the non-secure domain may initially specify the non-secure PAS, the PAS filter 20 may remap the PAS identifier of the request to specify the realm PAS instead, so that downstream memory system components treat the request as if it was issued from the realm domain all along. This sharing can improve performance because the operations for assigning a different domain to a particular memory region may be more performance intensive involving a greater degree of cache/TLB invalidation and/or data zeroing in memory or copying of data between memory regions, which may be unjustified if the sharing is only expected to be temporary.

FIG. 6 is a flow diagram showing how to determine the current domain of operation, which could be performed by the processing circuitry 10 or by address translation circuitry 16 or the PAS filter 20. At step 100 it is determined whether the current exception level 15 is EL3 and if so then at step 102 the current domain is determined to be the root domain 82. If the current exception level is not EL3, then at step 104 the current domain is determined to be one of the non-secure, secure and realm domains 86, 84, 88 as indicated by at least two domain indicating bits 14 within an EL3 control register of the processor (as the root domain is indicated by the current exception level being EL3, it may not be essential to have an encoding of the domain indicating bits 14 corresponding to the root domain, so at least one encoding of the domain indicating bits could be reserved for other purposes). The EL3 control register is writable when operating at EL3 and cannot be written from other exception levels EL2-EL0.

FIG. 7 shows an example of page table entry (PTE) formats which can be used for page table entries in the page table structures used by the address translation circuitry 16 for mapping virtual addresses to physical addresses, mapping virtual addresses to intermediate addresses or mapping intermediate addresses to physical addresses (depending on whether translation is being performed in an operating state where a stage 2 translation is required at all, and if stage 2 translation is required, whether the translation is a stage 1 translation or a stage 2 translation). In general, a given page table structure may be defined as a multi-level table structure which is implemented as a tree of page tables where a first level of the page table is identified based on a base address stored in a translation table base address register of the processor, and an index selecting a particular level 1 page table entry within the page table is derived from a subset of bits of the input address for which the translation lookup is being performed (the input address could be a virtual address for stage 1 translations of an intermediate address for stage 2 translations). The level 1 page table entry may be a "table descriptor" 110 which provides a pointer 112 to a next level page table, from which a further page table entry can then be selected based on a further subset of bits of the input address. Eventually, after one or more lookups to successive levels of page tables, a block or page descriptor PTE 114, 116, 118 may be identified which provides an output address 120 corresponding to the input address. The output address could be an intermediate address (for stage 1 translations performed in an operating state where further stage 2 translation is also performed) or a physical address (for stage 2 translations, or stage 1 translations when stage 2 is not needed).

To support the distinct physical address spaces described above, the page table entry formats may, in addition to the next level page table pointer 112 or output address 120, and any attributes 122 for controlling access to the corresponding block of memory, also specify some additional state for use in physical address space selection.

For a table descriptor 110, the PTEs used by any domain other than the non-secure domain 86 includes a non-secure table indicator 124 which indicates whether the next level page table is to be accessed from the non-secure physical address space or from the current domain's physical address space. This helps to facilitate more efficient management of page tables. Often the page table structures used by the root, realm or secure domains 24 may only need to define special page table entries for a portion of the virtual address space, and for other portions the same page table entries as used by the non-secure domain 26 could be used, so by providing the non-secure table indicator 124 this can allow higher levels of the page table structure to provide dedicated realm/secure table descriptors, while at a certain point of the page table tree, the root realm or secure domains could switch to using page table entries from the non-secure domain for those portions of the address space where higher security is not needed. Other page table descriptors in other parts of the tree of page tables could still be fetched from the relevant physical address space associated with the root, realm or the secure domain.

On the other hand, the block/page descriptors 114, 116, 118 may, depending on which domain they are associated with, include physical address space selection information 126. The non-secure block/page descriptors 118 used in the non-secure domain 86 do not include any PAS selection information because the non-secure domain is only able to access the non-secure PAS. However for the other domains the block/page descriptor 114, 116 includes PAS selection information 126 which is used to select which PAS to translate the input address into. For the root domain 22, EL3 page table entries may have PAS selection information 126 which includes at least 2 bits to indicate the PAS associated with any of the 4 domains 82, 84, 86, 88 as the selected PAS into which the corresponding physical address is to be translated. In contrast, for the realm and secure domains, the corresponding block/page descriptor 116 need only include one bit of PAS selection information 126 which, for the realm domain, selects between the realm and non-secure PASs, and for the secure domain selects between the secure and non-secure PASs. To improve efficiency of circuit implementation and avoid increasing the size of page table entries, for the realm and secure domains the block/page descriptor 116 may encode the PAS selection information 126 at the same position within the PTE, regardless of whether the current domain is realm or secure, so that the PAS selection bit 126 can be shared.

Hence, FIG. 8 is a flow diagram showing a method of selecting the PAS based on the current domain and the information 124, 126 from the block/page PTE used in generating the physical address for a given memory access request. The PAS selection could be performed by the address translation circuitry 16, or if the address translation circuitry forwards the PAS selection information 126 to the PAS filter 20, performed by a combination of address translation circuitry 16 and the PAS filter 20.

At step 130 in FIG. 8, the processing circuitry 10 issues a memory access request specifying a given virtual address (VA) as a target VA. At step 132 the address translation circuitry 16 looks up any page table entries (or cached information derived from such page table entries) in its TLB 18. If any required page table information is not available, address translation circuitry 16 initiates a page table walk to memory to fetch the required PTEs (potentially requiring a series of memory accesses to step through respective levels of the page table structure and/or multiple stages of address translation for obtaining mappings from a VA to an intermediate address (IPA) and then from an IPA to a PA). Note that any memory access requests issued by the address translation circuitry 16 in the page table walk operations may themselves be subject to address translation and PAS filtering, so the request received at step 130 could be a memory access request issued to request a page table entry from memory. Once the relevant page table information has been identified, the virtual address is translated into a physical address (possibly in two stages via an IPA). At step 134 the address translation circuitry 16 or the PAS filter 20 determines which domain is the current domain, using the approach shown in FIG. 6.

If the current domain is the non-secure domain then at step 136 the output PAS selected for this memory access request is the non-secure PAS.

If the current domain is the secure domain, then at step 138 the output PAS is selected based on the PAS selection information 126 which was included in the block/page descriptor PTE which provided the physical address, where the output PAS will be selected as either secure PAS or non-secure PAS.

If the current domain is the realm domain, then at step 140 the output PAS is selected based on the PAS selection information 126 included in the block/page descriptor PTE from which the physical address was derived, and in this case the output PAS is selected as either the realm PAS or the non-secure PAS.

If at step 134 the current domain is determined to be the root domain, then at step 142 the output PAS is selected based on the PAS selection information 126 in the root block/page descriptor PTE 114 from which the physical address was derived. In this case the output PAS is selected as any of the physical address spaces associated with the root, realm, secure and non-secure domains.

FIG. 9 illustrates an example of an entry of the GPT 56 for a given granule of physical addresses. The GPT entry 150 includes an assigned PAS identifier 152 identifying the PAS assigned to that granule of physical addresses and optionally incudes further attributes 154, which could for example include the sharing attribute information 156 described earlier which enables the granule of physical addresses to become visible in one or more other PASs other than the assigned PAS. The setting of the sharing attribute information 156 could be performed by the root domain on request from code running in the domain associated with the assigned PAS. Also, the attributes could include a pass-through indicator field 158 which indicates whether or not the GPT checks (for determining whether the selected PAS for a memory access request is allowed to access that granule of physical addresses) should be performed on the requester-side by the PAS filter 20 or by completer-side filtering circuitry at the completer device side of the interconnect as will be discussed further below. If the pass-through indicator 158 has a first value, then the requester-side filtering checks may be required at the PAS filter 20 on the requester side, and if these fail then the memory access request may be blocked and a fault may be signalled. However, if the pass through indicator 158 has a second value, then the requester-side filtering checks based on the GPT 56 may not be needed for memory access requests specifying a physical address in the granule of physical addresses corresponding to that GPT entry 150, and in this case the memory access request may be passed through to a cache 24 or interconnect 8 regardless of checking whether the selected PAS is one of the allowed PASs allowed to access that granule of physical addresses, with any such PAS-filtering checks then being performed later at the completer-side instead.

FIG. 10 is a flow diagram showing the requester-side PAS filtering checks performed by the PAS filter 20 at the requester side of the interconnect 8. At step 170 the PAS filter 20 receives the memory access request associated with a physical address and an output PAS which may be selected as shown in FIG. 8 described earlier.

At step 172 the PAS filter 20 obtains the GPT entry corresponding to the specified PA, either from the granule protection information cache 22 if available, or by issuing a request to memory to fetch the required GPT entry from a table structure stored in memory. Once the GPT entry needed has been obtained, then at step 174 the PAS filter determines whether the output PAS selected for the memory access request is the same as the assigned PAS 152 defined in the GPT entry obtained at step 172. If so, then at step 176 the memory access request (specifying the PA and the output PAS) can be allowed to be passed to the cache 24 or the interconnect 8.

If the output PAS is not the assigned PAS, then at step 178 the PAS filter determines whether the output PAS is indicated in the sharing attribute information 156 from the obtained GPT entry as an allowed PAS allowed to access the granule of addresses corresponding to the specified PA. If so, then again at step 176 the memory access request is allowed to be passed to the cache 24 or the interconnect 8. The sharing attribute information could be encoded as a unique bit (or set of bits) within the GPT entry 150, or could be encoded as one or more encodings of a field of the GPT entry 150 for which other encodings of that same field may indicate other information. If step 178 determines that the sharing attribute indicates that the output PAS other than the assigned PAS is allowed to access the PA, then at step 176 the PAS specified in the memory access request passed to the cache 24 or the interconnect 8 is the assigned PAS, not the output PAS. The PAS filter 20 transforms the PAS specified by the memory access request to match the assigned PAS so that downstream memory system components treat it the same as requests issued specifying the assigned PAS.

If the output PAS is not indicated in the sharing attribute information 156 as being allowed to access the specified physical address (or alternatively, in an implementation which does not support the sharing attribute information 156, step 178 is skipped) then at step 180 it is determined whether the pass through indicator 158 in the obtained GPT entry for the target physical address identifies that the memory access request can be passed through to the cache 24 or the interconnect 8 regardless of the checks performed at the requester-side PAS filter 20, and if the pass-through indicator is specified then at step 176 and the memory access request is again allowed to proceed (specifying the output PAS as the PAS associated with the memory access request). Alternatively, if none of the checks at steps 174, 178 and 180 identify that the memory access request is allowed, then at step 182 the memory access request is blocked. Hence the memory access request is not passed to the cache 24 or to the interconnect 8, and a fault may be signalled which may trigger exception processing to deal with the fault.

While steps 174, 178, 180 are shown sequentially in FIG. 10, these steps could also be implemented in parallel or in a different order if desired. Also it would be appreciated that steps 178 and 180 are not essential and some implementations may not support use of the sharing attribute information 156 and/or the pass through indicator 158.

FIG. 11 summarises the operation of the address translation circuitry 16 and PAS filter. The PAS filtering 20 can be regarded as an additional stage 3 check performed after the stage 1 (and optionally stage 2) address translations performed by the address translation circuitry. Note also that the EL3 translations are based on page table entries which provide two bits of address based selection information (labelled NS, NSE in the example of FIG. 11), while a single bit of selection information "NS" is used to select the PAS in the other states. The security state indicated in FIG. 11 as input to the granule protection check refers to the Domain ID identifying the current domain of the processing element 4.

FIG. 12 shows an example of a network of devices within which the present technique may be applied. In particular, FIG. 12 shows a number of devices 200 coupled via a root port 202 and an interconnect 204 to a number of processor blocks (processor cores) 206, an encryption engine 208 and, via the encryption engine 208, a memory 210. The interconnect 204 is an example of interconnect circuitry to couple a device (such as one of the devices 200 shown in the figure) to one or more processing elements (such as the processing circuitry 212A. 212B, 212C shown within the processor blocks 206A, 206B, 206C shown in the figure). For example, the interconnect 204 could have the same or a similar configuration to the interconnect 8 shown in FIG. 1.

The interconnect and the components connected to it, such as the root port 202 and the processor blocks 206, may employ an interconnect communication protocol to exchange message between them. However, devices that operate in accordance with an alternative communication protocol, and which can hence be viewed as external devices to the subsystem containing the interconnect, can also connect to the interconnect, for example via the root port 202 shown in FIG. 12. By way of example, the devices 200A and 200B illustrated in FIG. 12 could communicate with the root port 202 using a packet network, and could employ a packet protocol of that packet network, such as the Peripheral Component Interconnect Express (PCle) protocol. The root port hence acts as a bridge between the protocol used by the external devices 200A, 200B and the protocol employed by the interconnect and connected components connected thereto.

Access to the memory 210 may be controlled by a memory controller (not shown in FIG. 12) such as the memory controller MC shown in FIG. 3. The encryption engine 208 is provided to encrypt data before it is stored to memory 210, or to decrypt data when it is retrieved from memory 210.

Each of the processor blocks 206 comprises processing circuitry 212, which may be identical to the processing circuitry 10 shown in FIG. 1 and which is configured to execute program instructions including (for example) load/store instructions for accessing data stored in memory 210.

Each set of processing circuitry 212 has access to a plurality of caches, each storing copies of some of the data stored in the memory 210. In some examples, the caches shown in FIG. 12 may be equivalent to the caches 24 between the PAS filter 20 and the interconnect 8 in FIG. 1.

In particular, each processor block 206 comprise a level 1 data cache 214, for storing copies of data stored in memory 210, and a level 1 instruction cache 216, for storing copies of instructions stored in memory 210. Each processor block 206 may also have access to a unified level 2 cache 218, which stores copies of both data and instructions. Each of the unified level 2 caches 218 may be accessible to only one processor block 206—as in the example of processor block 206C, which incorporates its own level two cache 218C—or may be shared between multiple processor blocks 206—as in the example of processor blocks 206A and 206B, which are considered to be within the same cluster 220 of processor blocks, and share a level 2 cache 218A.

Accordingly, the memory system of the network shown in FIG. 12 may have a hierarchical structure, with multiple levels of cache provided between the memory 210 and each of the sets of processing circuitry 212. The caches 214, 216, 218 may—as mentioned above—store copies of data or instructions stored in the memory 210. The data or instructions stored in the caches can then be accessed by the processing circuitry 212 with reduced latency. This reduced latency is the result, in part, of caches typically being significantly smaller than the main memory 210, so that looking up an address in one of the caches may be significantly quicker than looking up an address in memory. In addition, the caches are closer to the processing circuitry 212 than the memory 210—in particular, the memory 210 is separated from the processing circuitry 212 by other components, such as the interconnect 204, whereas the caches 214, 216, 218 are not—which also reduces the latency associated with accessing the data held in the caches. Accordingly, allowing some data—especially data which is frequently accessed by the processing circuitry—to be stored in local caches allows the performance of each processor block 206 to be improved, by reducing the latency associated with data accesses.

As noted above, the system illustrated in FIG. 12 comprises multiple levels of caches. This is not essential—even providing a processing element with a single cache will provide some performance benefit—but it can be particularly advantageous as it allows significantly more data to be stored closer to the processing circuitry, without needing to increase the size of the level 1 cache 214. Typically, the level 1 cache 214 will store the data which has most recently been accessed by the processing circuitry 212 (and is thus most likely to be accessed again), and each subsequent level of cache will store data accessed less recently than the data stored in the previous cache levels.

The caches may be inclusive, meaning that data stored in one cache is also stored in each subsequent cache level. Practically, this means that each cache beyond the level 1 cache stores all of the data (including instructions) stored in the previous cache level, and some additional data. This means that when an item of data is evicted from one cache (e.g. due to a cache replacement policy such as a least recently used (LRU) policy), it is likely to remain in the cache in the subsequent level. For example, if data is evicted from the level 1 data cache 214, it will remain in the level 2 cache 218 for at least some time after its eviction from the level 1 data cache 214. This means that, if the processing circuitry needs to access that data again after it has been evicted from the level 1 data cache 214 (but before it has been evicted from the level 2 cache), the data can still be accessed without needing to retrieve the data from memory, albeit with greater latency than if the data had been present in the level 1 data cache 214.

Alternatively, the caches may be exclusive, meaning that a given item of data is stored in only cache level at a given time.

The choice of inclusive or exclusive caches is an implementation detail, which can be chosen based on the needs of the system. Moreover, it is not necessary for all of the caches in the system to be either inclusive or exclusive. Indeed, given data items within an inclusive cache may be treated as exclusive, such that they are stored in only one cache.

It will be appreciated that, while FIG. 12 only shows two levels of cache between the memory 210 and the processing circuitry 212, there may be any number of levels of cache provided. Moreover, while the cache levels in FIG. 12 have been numbered such that the lowest number corresponds with the cache closest to the processing circuitry (i.e. level 1 is the closest to the processing circuitry 212, while level 2 is further from the processing circuitry 212 than level 1), it will be appreciated that this is merely a label, and any other choice of labelling could be used without implying a different functionality.

Processes being executed by the processing circuitry 212 of each processor block 206 may be executed within one of the domains (worlds) described above. For example, processes may execute within the secure domain 84, the less secure domain 86, the realm domain 88 or the root domain 82, and accesses to memory by those processes may be controlled according to the techniques discussed in detail above. For example, a separate physical address space (PAS) may be provided for each of the domains.

Moreover, processes executed by the processing circuitry may be executed within different trusted execution environments, wherein processes executed in one trusted execution environment are isolated from processes executed in other trusted execution environments. For example, a given processing element may operate entirely within one trusted execution environment, such that any processes executed on that processing element are executed within the trusted execution environment associated with the processing element. The processing element may operate within different trusted execution environments at different times. Alternatively, different processes executing on the processing circuitry 212 of a given processing element may be executed in different trusted execution environments. These trusted execution environments may, for example, correspond with the realms provided within the realm domain, as described above. However, it will be appreciated that it may also be possible to provide trusted execution environments within the other domains, such as in the secure domain or the root domain. Moreover, it is also possible to provide trusted execution environments in systems without separate domains of execution.

As mentioned above, the processor blocks 206 are connected to an interconnect 204, which allows them to communicate with the memory 210 via the encryption engine 208 and with the devices 200 via the root port. The interconnect 204 in this example comprises at least one home node 222, configured to control access to a portion of the memory 210 by any of the devices connected to the interconnect (e.g. the processor blocks 206 or the devices 200).

Each of the devices 200 may be a requester device 4, as illustrated in FIG. 1, for example. Alternatively, the devices 200 may be any other device capable of sending transactions to the interconnect 204, requesting access to data stored in the memory 210. Each of the devices may operate within a given trusted execution environment, and may thus be permitted to access data associated with that trusted execution environment. For example, a particular process executing on one of the devices may be considered to be executed within a particular trusted execution environment; alternatively, a particular device itself may be considered to be within a given trusted execution environment, such that any process executed by that device is also considered to be within that trusted execution environment. In accordance with the techniques described herein, transactions issued by one of the devices 200 may include a trusted execution environment identifier (also referred to herein as a realm identifier, or realm ID), identifying the trusted execution environment to which the process issuing the transaction belongs.

The devices 200 are connected to the interconnect 202 via a root port 202. In particular, the devices 200 and the root port 202 are provided within a hierarchical structure, with the root port 202 at a first level of devices connected directly to the interconnect 204, and the devices 200 connected to the interconnect via the root port. It will be appreciated that, while only a single root port is shown in FIG. 12, there may be multiple root ports provided. Moreover, while only two levels of devices are shown in the device network of FIG. 12 that comprises the devices 200 and the root port 202, there may be further levels of devices between the devices 200 and the root port 202, with each device in a given level connected to one of the devices in the previous level in a tree-like structure. In other examples, the devices 200 may even be connected directly to the interconnect, without an intervening root port.

One type of transaction which may be issued by the devices 200 is a stashing transaction. A stashing transaction comprises a request to access data in a storage structure accessible to one of the processing elements, rather than accessing the data in the memory 210. In the example of FIG. 12, the storage structure comprises one of the caches 214, 216, 218; however, it will be appreciated that in systems without caches, this could refer to any storage structure other than the memory 210, for example any storage structure on the same side of the interconnect 204 as at least one of the processor blocks 206.

The way in which a given stashing transaction indicates the cache to which it is to be routed may vary. In some examples, a steering tag is used to indicate the cache to which the transaction should be routed, whereas in other examples this may be determined based on the trusted execution identifier indicated by the stashing transaction.

Allowing transactions to be steered to the caches in this way, so that stashing transactions can cause data to be written directly to one of the caches, rather than to the memory 210, can improve the performance of the system. In particular, the latency associated with a subsequent access to that data by one of the processing elements can be reduced, since the data will already be present in the cache—for example, the latency associated with retrieving the data from memory can be avoided.

It might, however, seem counter-intuitive to allow transactions issued by devices to write data directly to the caches accessible to the processor blocks 206, especially if the processor blocks 206 and their caches are operating within trusted execution environments. A skilled person might assume that allowing an external device to directly access the caches within a given trusted execution environment might pose a security risk.

However, the inventors of the present technique realised that this security risk could be mitigated by providing secure stashing decision circuitry 224 to receive stashing transactions from the device (or devices 200) and to redirect permitted stashing transactions to a given storage structure (e.g. one of the caches 214, 216, 218) accessible to at least one of the one or more processor blocks 206. In particular, the secure stashing decision circuitry 224 is configured, in response to receiving a given stashing transaction, to determine whether the given stashing transaction comprises a trusted execution environment identifier associated with a given trusted execution environment, and to treat the given stashing transaction as a permitted stashing transaction when redirection requirements, dependent on the trusted execution environment identifier, are met. This provides improved security, so that the performance benefits associated with stashing transactions can be provided without compromising the security of the system.

As shown in FIG. 12, the secure stashing decision circuitry 224 could be provided within the root port 202. However, it is also possible for the secure stashing decision circuitry 224 to be provided in a different location, such as within the home node 222 in the interconnect 204.

One way in which the secure stashing decision circuitry 224 can determine whether a stashing transaction is a permitted stashing transaction is based on one or both of a trusted execution environment identifier (realm ID) and a steering tag associated with the stashing transaction (or, indeed, based on the absence of either of these identifiers).

FIG. 13 illustrates an example of a stashing transaction 300 comprising a steering tag 302 and a realm ID 304. As noted above, the realm ID 304 indicates the trusted execution environment within which the device issuing the transaction is executing, and the steering tag 302 indicates a particular storage structure (e.g. cache) to which the transaction is to be redirected (if permitted by the secure stashing decision circuitry). The stashing transaction illustrates in FIG. 13 also comprises a payload 306, which is the data which is to be written to the identified storage structure and its associated memory address. Although the stashing transaction is intended to be redirected to the cache instead of the memory, the memory address may still be provided so that the appropriate entry within a given cache can be identified.

FIG. 14 illustrates an example of the secure stashing decision circuitry 224 shown in FIG. 12. As discussed above, the secure stashing decision circuitry 224 is configured to receive stashing requests from at least one of the devices 200, determine whether they are permitted stashing transactions, and redirect any permitted transactions to one of the caches in the system.

In the example of FIG. 14, the secure stashing decision circuitry 224 comprises a target cache table 400, and is configured to determine whether a received stashing transaction is a permitted stashing transaction by looking up the target cache table 400.

FIG. 15 illustrates one example of a target cache table 400. In this particular example, each entry of the target cache table 400 specifies a steering tag, a target cache associated with that steering tag, and a realm ID identifying a trusted execution environment within which that cache operates. This table can be referenced using a steering tag, to determine the associated target cache and its realm ID, or using a realm ID, to determine which caches are within that realm. The value looked up in the table may depend on the format of a given stashing transaction received by the secure stashing decision circuitry. For example, upon receiving a stashing transaction, the secure stashing decision circuitry can determine whether or not the transaction comprises a steering tag and a realm ID.

If the received stashing transaction comprises a valid steering tag and a valid realm ID, the secure stashing decision circuitry can reference the target cache table 400 using either the steering tag or the realm ID. In one particular example, the secure stashing decision circuitry looks up the steering tag in the target cache table 400, to find the target cache associated with the steering tag and its associated realm ID. If the realm ID of the target cache matches the realm ID of the received stashing transaction, the secure stashing decision circuitry redirects the received stashing transaction to the identified target cache.

If the received stashing transaction comprises a valid steering tag but no realm ID, the secure stashing decision circuitry may look up the steering tag in the target cache table 400. If the realm ID associated with that steering tag indicates that the associated target cache is in a realm, then the stashing transaction is rejected by the secure stashing decision circuitry; otherwise, the secure stashing decision circuitry redirects the stashing transaction to the identified target cache.

If the received stashing transaction comprises a valid realm ID but no steering tag, the secure stashing decision circuitry may look up the realm ID in the target cache table 400, and redirect the stashing transaction to a target cache associated with that realm ID.

It will be appreciated that the target cache table 400 shown in FIG. 15 is only one example of how the target cache table 400 may be arranged, and other examples are also possible. For example, a separate table may be provided for each realm, with the table to be looked up being selected based on the realm ID. Alternatively, a separate table may be provided for each steering tag.

FIG. 15 also shows an example of a realm key ID table 500 which may optionally also be provided in the secure stashing decision circuitry. In some examples of the present technique, a realm ID specified by a stashing transaction can be used to identify a realm key ID, which can subsequently be used to identify a realm encryption key, used to encrypt data associated with a particular realm before it is stored to memory. Providing the realm key ID table 500 in the secure stashing decision circuitry allows the secure stashing decision circuitry to identify, based on the realm ID, the realm key ID for a given stashing transaction. The realm key ID could then be used in a number of different ways; for example, the realm key ID may be sent to the target cache with the stashing transaction, where it might—in at least some situations—be written to the target cache alongside the data identified by the stashing transaction.

Optionally, the secure stashing decision circuitry may also be configured to control cache inclusivity in relation to a given permitted stashing transaction. As discussed above, the processing system may be provided with multiple levels of cache in a hierarchical structure, and at least some of the caches may be "inclusive", meaning that copies of the data in one cache are also held in caches at lower levels in the hierarchy (e.g. data in a level one cache is also held in the level 2 cache). However, if a particular item of data is intended to only be accessible to particular processes—for example, if the data item is associated with a particular realm—it may not be desirable for this item of data to be stored in multiple caches. In particular, they may be security risks associated with storing sensitive data (e.g. data associated with a realm) in a cache which is shared between multiple processing elements, such as some level 2 caches. Therefore, allowing the secure stashing decision circuitry to control cache inclusivity based on the realm ID can provide improved security. For example, the secure stashing decision circuitry may be arranged to prevent copies of the data associated with a given stashing transaction from being stored in more than one cache when a realm ID is present, or when the realm ID has a predetermined value.

It will be appreciated, however, that the ability of the secure stashing decision circuitry to identify realm key IDs or control cache inclusivity for permitted stashing transactions are optional features, which can be provided or omitted without affecting the ability of the secure stashing decision circuitry to control which stashing transactions are redirected and which are rejected.

While several options for how stashing can be controlled by the secure stashing decision circuitry on the basis of the steering tag and realm ID have been discussed above, FIG. 16 provides an overview of how the secure stashing decision circuitry might respond to a given combination of steering tag and/or realm ID. The table in FIG. 16 does not illustrate controlling cache inclusivity or identifying realm key IDs in the manner discussed above, but it will be appreciated that either (or both) of these optional features could be provided in addition to the responses illustrated in the table. It will also be appreciated that FIG. 16 shows how the secure stashing decision circuitry may treat stashing transactions when the targeted cache and/or memory address identified in the request is within a realm—the secure stashing decision circuitry may treat other stashing transactions differently.

The secure stashing decision circuitry of the present technique is configured, in response to receiving a stashing transaction, to determine whether the stashing transaction comprises a realm ID (trusted execution environment identifier) and—at least in this example—whether the stashing transaction comprises a steering tag. Then, based on the realm ID and steering tag (or the absence thereof), the secure stashing decision circuitry can determine how to treat the stashing transaction.

A number of possible actions by the secure stashing decision circuitry are illustrated in the table of FIG. 16. However, it will be appreciated that these are just examples, and the actual implementation of the present technique may be different. For example, in some situations where the stashing transaction is treated as a permitted transaction (for example, when the steering tag is absent but the realm ID is present and valid), the stashing transaction may instead, in some implementations, be rejected. It will also be appreciated that the examples illustrated in this table are not considered to apply when the cache targeted by the received stashing transaction is not in a realm (for example, if the cache is in the less secure domain).

According to the table of FIG. 16, when the realm ID is absent, or when the realm ID is present but invalid, the stashing transaction is rejected regardless of whether or not a steering tag is present. In this situation, the absence of a realm ID means that it cannot be easily determined whether the process or device sending the transaction is trusted to access data in any of the realms provided. Therefore, the transaction is rejected to protect the data associated with any of the realms from access by a potentially untrusted—or even malicious—actor.

When the realm ID is present and valid, it can be assumed that the process or device issuing the stashing transaction is trusted to access any of the caches within the realm identified by the realm ID. Therefore, the action taken depends on the steering tag.

In particular, if the realm ID is present and valid, but the steering tag is absent, the transaction is (at least in this example) redirected to a cache within the realm associated with the realm ID of the transaction. In this situation, although it may not be known which cache was intended to be targeted, it can be more efficient for the secure stashing decision circuitry to assume that the target cache is a cache within the identified realm, rather than rejecting the transaction so that it needs to be re-issued. This allows the data to be stored in a cache accessible to a processing element executing processes within that realm, which provides the performance benefits discussed in detail above (e.g. reduced latency associated with subsequent accesses to the data). If it subsequently turns out that the assumption about which cache is the target cache was incorrect, the security of the system will not have been compromised, because the valid realm ID indicated that the device/process issuing the transaction has permission to access data within that realm.

On the other hand, if the realm ID is present and valid, but the steering tag is present but invalid, the transaction is rejected. This response may be appropriate since the presence of the steering tag indicates that the process/device issuing the transaction intended a particular cache to be the target cache, but the secure stashing decision circuitry is not able to determine which cache that is. However, in other examples the secure stashing decision circuitry may instead choose to treat the transaction as if the steering tag was absent, and redirect it to a cache in the realm associated with the realm ID.

Finally, if both the realm ID and the steering tag are present and valid, the secure stashing decision circuitry is configured to check whether the target cache identified by the steering tag is in the same realm as that identified by the realm ID. If the realm for both is the same, the transaction is redirected; otherwise, the transaction is rejected. In this way, the performance benefits of allowing cache stashing can be achieved, without compromising the security of the system. In particular, any transactions attempting to access a cache within a realm which they are not permitted to access are rejected.

When an access is rejected, the secure stashing decision circuitry may assert an error signal, which may cause the error to be logged in a set of registers accessible to the secure stashing decision circuitry. For example, these registers could be within the root port, or within the interconnect.

Turning now to FIG. 17, this figure is a flow chart illustrating an example of a method carried out by the secure stashing decision circuitry according to the present technique. The method shown in FIG. 17 comprises a step 702 of waiting for a stashing transaction to be received. When a stashing transaction is received by the secure stashing decision circuitry, the method proceeds to a step 704 of determining whether the stashing transaction comprises a realm ID. If no realm ID is present, the method comprises a step 706 of checking whether the transaction comprises a valid steering tag. If there is no valid steering tag, the transaction is rejected 708, since the secure stashing decision circuitry cannot identify a cache to redirect the transaction to. On the other hand, if there is a valid steering tag present, the secure stashing decision circuitry looks up the target cache associated with the steering tag and determines 710 whether the target cache is in a realm. If the target cache is in a realm, the transaction is rejected 708, since the transaction does not comprise a realm ID corresponding with the realm of the target cache. On the other hand, if the target cache is not in a realm, the transaction is redirected 712 to the cache identified by the steering tag.

Returning to step 704, if it is determined that the realm ID is present, then the method proceeds to a step 714 of determining whether the realm ID is valid. If the realm ID is invalid, then the transaction is rejected 708. On the other hand, if the realm ID is valid, the method proceeds to a step 716 of determining whether the transaction comprises a steering tag.

If there is no steering tag present, the transaction is redirected 718 to a cache in the realm identified by the realm ID. On the other hand, if a steering tag is present, the method proceeds to a step 720 of determining whether the steering tag is valid.

If the steering tag is invalid, the transaction is rejected 708. On the other hand, if the steering tag is present, the method proceeds to a step 722 of determining whether the cache identified by the steering tag is in the realm identified by the realm ID. If the cache is in the same realm as that identified by the realm ID, the transaction is redirected at step 712 to the identified cache. On the other hand, if the cache is not in the realm identified by the realm ID, the transaction is rejected at step 708.

Although not illustrated in FIG. 17, it will be appreciated that a number of additional steps may also, optionally, be provided. For example, steps 718 and 712 may also include controlling cache inclusivity based on the realm ID. Also, an additional step could be provided between steps 716 and 718, and/or between steps 722 and 712, of looking up the realm key ID for the realm identified by the transaction.

According to this method, stashing transactions issued by one or more devices can, provided that certain redirection requirements dependent on the realm ID are met, be redirected to caches (or other storage structures on the same side of the interconnect as one or more processing elements) in the system. This provides a significant performance benefit, since it allows subsequent accesses to data written in response to a permitted stashing transaction to be accessed from the cache, rather than the data being retrieved from memory, which reduces the latency associated with the access. In addition, by only redirecting stashing transactions for which redirection requirements are met, the security of the system can be maintained. In particular, by making the redirection requirements dependent on a realm ID, the isolation of each realm within (for example) the realm domain can be maintained. Accordingly, the present techniques provide improved performance without sacrificing security.

FIG. 18 schematically illustrates an example of a system 800 in which the present technique may be implemented. The system 800 comprises multiple sockets 802, each holding at least one processing element 803 (which may comprise the processing circuitry 212 shown in FIG. 12). In this example each socket contains a System-on-Chip (SoC). Each of the processing elements 803 has access to at least one cache 214 (although not shown in this diagram, it will be appreciated that there may also be other caches in further levels of the memory hierarchy, as discussed in detail above). Socket A 802A also holds a shared device 200, which is coupled to the processing elements 803 by an interconnect 204. In particular, a root port 202 is provided to couple the device 200 to the interconnect 204. Memory 210 is also provided, accessible to the processing elements 803 and the device 200 via the interconnect 204. An encryption engine 208 is also provided, to encrypt data before it is stored to the memory 210.

The shared device 200 is executing a set of processes which define a virtual device, the virtual device being considered to be operating within a particular realm. The shared device 200 is configured to issue transactions—including stashing transactions—to the interconnect 204, the transactions being generated by the virtual device. As discussed above, it can be particularly advantageous to be able to redirect stashing transactions issued by the device 200 to one of the caches 214 in the system, so that the data included in the transaction can subsequently be accessed by one of the processing elements 803 with reduced latency.

Some of the processing elements 803A, 803B in this example are executing processes within a particular realm (the same realm as for the virtual device), with their associated caches 214A, 214B therefore being considered to be private caches within the realm. On the other hand, one of the processing elements 803C is under the control of an attacker, so that at least the cache 214C associated with that processing element is accessible to the attacker. This means that any data stored in this particular cache 214C is visible to the attacker and is, therefore, not secure.

In addition, the link 806 between socket A 802A and socket B 802B is non-secure (or, more particularly, less secure than a preferred standard of security), so that an attacker-controlled probe 804 can intercept signals transmitted via the non-secure link 806. Therefore, data accessed in the cache 214D on socket B is also accessible to the attacker.

Accordingly, while it would be acceptable to redirect stashing transactions issued by the shared device 200 to any of the caches 214A, 214B within the realm—since the virtual device executing on the shared device 200 is operating within the same realm—it would not be appropriate to redirect any of these stashing transactions to either of the caches 214C, 214D under the control of the attacker, since this would give the attacker access to potentially sensitive data associated with the realm.

In practice, it will not typically be obvious if one or more processing elements 803C are under the control of an attacker, or if an attacker-controlled probe is intercepting signals over the non-secure link 806. Therefore, preventing attackers from accessing sensitive data is not as straightforward as avoiding writing sensitive data to the caches under the control of an attacker.

Therefore, the system of FIG. 18 allows certain, sensitive processes (e.g. processes for which a secure environment is preferred) to be executed within isolated realms, where processes executing in one realm are isolated from processes executing in other realms, and also from any processes executing outside of any of the realms. In the example of FIG. 18, thread A and thread B are being executed within a realm, so that they are isolated from any other processes outside of the realm. Two of the caches 214A, 214B are also considered to be within the same realm, so that only processes in that realm are permitted to access the cache. Therefore, processes outside of the realm—including, for example, any processes executing on the attacker-controlled processing element 803C—are prevented from accessing any sensitive data associated with thread A or thread B. This maintains the security of these threads, even if some of the less-secure processing components of the system 800 are infiltrated by an attacker.

Within such a realm-based system, it is also possible to provide the performance benefits associated with stashing transactions. In particular, as discussed above, the stashing transactions can be tagged with a realm ID indicating the realm within which the device 200 is executing. Secure stashing decision circuitry 224 is then provided to control whether or not the stashing transactions are redirected to one of the caches 214. The secure stashing decision circuitry 224 could be provided within the root port 224 as shown in FIG. 12, or within the interconnect circuitry 204. For example, as illustrated in FIG. 18, the secure stashing decision circuitry could be provided in a home node 222 of the interconnect 204. It will be appreciated that, while the secure stashing decision circuitry 224 is shown in both the root node 202 and the home node 222, this is purely for illustrative purposes—in reality, the secure stashing decision circuitry can be in the root port 224 or the home node 222, but not necessarily in both locations.

The secure stashing decision circuitry 224 is configured to determine whether or not a stashing transaction issued by the device 200 is a permitted transaction, by considering redirection requirements that depend on a realm ID specified by the stashing transaction. Permitted transactions may then be directed to one of the caches 214A, 214B within the realm.

FIG. 18 also shows an example of the secure stashing decision circuitry 224 in more detail. The secure stashing decision circuitry 224 in this example comprises validity and enforcement circuitry 808, which is configured to take, as inputs, the realm ID and steering tag of a given stashing transaction and to determine, for a permitted stashing transaction and by referencing a target cache table, the identity of the target cache and, optionally, the realm key ID for the realm.

Accordingly, the system 800 of FIG. 18 provides a particular example of how the present technique might be implemented, in order to provide the above-described advantages of improved performance, without compromising security.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:

interconnect circuitry configured to couple a device to one or more processing elements, at least one of the one or more processing elements being configured to operate in a trusted execution environment, and to couple a memory for storing data to the device and to the one or more processing elements; and secure stashing decision circuitry configured to receive stashing transactions from the device, each of the stashing transactions comprising a request to access data associated with a location in the memory, and to redirect permitted stashing transactions from the memory to a given storage structure configured to store a copy of the data and accessible to at least one of the one or more processing elements, wherein the given storage structure is separate from the memory and is located on a same side of the interconnect circuitry as the at least one of the one or more processing elements, wherein the secure stashing decision circuitry is configured, in response to receiving a given stashing transaction including a write request to write data associated with a location in the memory, to determine whether the given stashing transaction comprises a trusted execution environment identifier associated with a given trusted execution environment, to treat the given stashing transaction as a permitted stashing transaction, and to cause the data to be written to the given storage structure, when redirection requirements, dependent on the trusted execution environment identifier, are met.

2. The apparatus of claim 1, wherein whether the redirection requirements are met is dependent on at least one of:

whether the trusted execution environment identifier is present; and the value of the trusted execution environment identifier.

3. The apparatus of claim 1, wherein:

the secure stashing decision circuitry is configured, when the given storage structure is in a trusted execution environment, to reject the given stashing transaction when the trusted execution environment identifier is absent or invalid.

4. The apparatus of claim 3, wherein the secure stashing decision circuitry is configured, in response to rejecting the given stashing transaction, to assert an error signal.

5. The apparatus of claim 1, wherein the given storage structure is selected in dependence on the permitted stashing transaction.

6. The apparatus of claim 1, wherein:

the secure stashing decision circuitry is configured to determine whether the given stashing transaction comprises a steering tag indicative of the given storage structure; and when the secure stashing decision circuitry determines that the given stashing transaction comprises the steering tag, whether the redirection requirements are met is further dependent on the steering tag.

7. The apparatus of claim 6, wherein the secure stashing decision circuitry is configured to reject the given stashing transaction when at least one of:

the given storage structure is in a first trusted execution environment and the trusted execution environment identifier is absent or invalid;

the given storage structure is in a first trusted execution environment and said trusted execution environment identifier is associated with a different trusted execution environment; and the steering tag is invalid.

8. The apparatus of claim 6, wherein the given storage structure is selected in dependence on at least one of:

a value of the trusted execution environment identifier; and a value of the steering tag.

9. The apparatus of claim 8, wherein the secure stashing decision circuitry is configured to select the given storage structure in dependence on the value of the steering tag unless the steering tag is absent.

10. The apparatus of claim 1, wherein:

the given stashing transaction comprises a request to access data at a given location in memory; and the secure stashing decision circuitry is configured to identify, based on the trusted execution environment identifier, an encryption key identifier indicative of an encryption key for encrypting the data stored at the given location in the memory.

11. The apparatus of claim 10, wherein each of the stashing transactions comprises a write request to write data to a location associated with a location in the memory; and the secure stashing decision circuitry is configured to cause the encryption key identifier and the data to be written to the given storage structure.

12. The apparatus of claim 1, wherein the given storage structure comprises a cache.

13. The apparatus of claim 12, wherein the secure stashing decision circuitry is configured to control, based on the trusted execution environment identifier, whether at least one given cache line of the cache is permitted to also be held in at least one other cache.

14. The apparatus of claim 1, comprising a root port provided at a first level of devices within a hierarchical structure of devices, the device being provided within the hierarchical structure of devices and being coupled to the interconnect via the root port.

15. The apparatus of claim 14, wherein:

the device comprises a requester device within a packet network, the requester device being configured to transmit the stashing transactions to the root port in accordance with a packet protocol of the packet network, for onward propagation to the interconnect.

16. The apparatus of claim 15, wherein the packet protocol comprises the Peripheral Component Interconnect Express (PCIe) protocol.

17. The apparatus of claim 1, wherein:

the interconnect comprises home node circuitry responsible for controlling access to a portion of the memory; and the home node circuitry comprises the secure stashing decision circuitry.

18. A method of stashing transactions, the method comprising:

receiving stashing transactions from a device, the device being coupled, via interconnect circuitry, to one or more processing elements at least one of the one or more processing elements being configured to operate in a trusted execution environment, wherein a memory for storing data is coupled to the device and to the one or more processing elements via the interconnect circuitry;

redirecting permitted stashing transactions from the memory, each of the stashing transactions comprising a request to access data associated with a location in the memory, to a given storage structure for storing a copy of the data and accessible to at least one of the one or more processing elements, wherein the given storage structure is separate from the memory and is located on a same side of the interconnect circuitry as the at least one of the one or more processing elements; and in response to receiving a given stashing transaction including a write request to write data associated with a location in the memory, determining whether the given stashing transaction comprises a trusted execution environment identifier associated with a given trusted execution environment, treating the given stashing transaction as a permitted stashing transaction, and causing the data to be written to the given storage structure, when redirection requirements, dependent on the trusted execution environment identifier, are met.

* * * * *